United States Patent
Rollinger et al.

(10) Patent No.: US 11,549,450 B2
(45) Date of Patent: Jan. 10, 2023

(54) SYSTEM AND METHOD FOR CONTROLLING VEHICLE ACCUMULATOR AIRFLOW

(71) Applicant: Ford Global Technologies, LLC, Dearborn, MI (US)

(72) Inventors: John Eric Rollinger, Troy, MI (US); Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/650,194

(22) Filed: Feb. 7, 2022

(65) Prior Publication Data
US 2022/0154655 A1    May 19, 2022

Related U.S. Application Data

(63) Continuation of application No. 16/895,771, filed on Jun. 8, 2020, now Pat. No. 11,280,282.

(51) Int. Cl.
| | |
|---|---|
| F02D 41/00 | (2006.01) |
| F02B 33/44 | (2006.01) |
| F02B 21/00 | (2006.01) |
| F02B 37/04 | (2006.01) |
| F02B 37/16 | (2006.01) |

(52) U.S. Cl.
CPC .......... *F02D 41/0007* (2013.01); *F02B 21/00* (2013.01); *F02B 33/44* (2013.01); *F02B 37/16* (2013.01); *F02B 37/04* (2013.01)

(58) Field of Classification Search
CPC .......... F02B 37/04; F02B 39/10; F02B 33/44; F02B 21/00
See application file for complete search history.

(56) References Cited

U.S. PATENT DOCUMENTS

| | | | |
|---|---|---|---|
| 8,657,044 B2 | 2/2014 | Dönitz et al. | |
| 2006/0137345 A1 | 6/2006 | Cho | |
| 2012/0186249 A1* | 7/2012 | Guzzella | F02B 29/00 60/612 |
| 2012/0216532 A1 | 8/2012 | Schaffeld et al. | |
| 2015/0377157 A1 | 12/2015 | Almkvist et al. | |
| 2017/0198630 A1 | 7/2017 | Meng et al. | |

FOREIGN PATENT DOCUMENTS

WO    WO-2020074103 A1 *    4/2020    .............. B60T 17/02

* cited by examiner

*Primary Examiner* — Ngoc T Nguyen
(74) *Attorney, Agent, or Firm* — Vincent Mastrogiacomo; McCoy Russell LLP

(57) ABSTRACT

Methods and systems are provided for controlling airflow of an accumulator of a motorized vehicle. In one example, a method includes storing pressurized gases within the accumulator by flowing intake air from a compressor of an engine of the vehicle to a pressure booster arranged upstream of the accumulator. Pressurized gases stored within the accumulator may be used to drive one or more pneumatic devices.

19 Claims, 6 Drawing Sheets

SYSTEM AND METHOD FOR CONTROLLING VEHICLE ACCUMULATOR AIRFLOW

CROSS REFERENCE TO RELATED APPLICATIONS

The present application is a continuation of U.S. Non-Provisional patent application Ser. No. 16/895,771, entitled "SYSTEM AND METHOD FOR CONTROLLING VEHICLE ACCUMULATOR AIRFLOW", and filed on Jun. 8, 2020. The entire contents of the above-listed application are hereby incorporated by reference for all purposes.

FIELD

The present description relates generally to methods and systems for controlling airflow of an accumulator of a motorized vehicle.

BACKGROUND/SUMMARY

Vehicles may utilize on-board compressed air generated in the engine air induction system to supply tools, such as described in US 20060137345. However, the inventors herein have recognized that the pressure generated by boost devices optimized for vehicle driving operation generate creates flows higher than needed for air-power tools, along with pressure lower then needed for such tools.

In one example, the issues described above may be addressed by a method for an engine comprising controlling a flow of engine intake air to a pressure booster arranged downstream of an intake air compressor based on a gas pressure of an accumulator.

The flow rate of engine intake air entering the pressure booster may be higher than the flow rate of air exiting the air pressure booster, and high pressure air from the accumulator may be supplied to off-board devices. In this way, it is possible to provide more effective air supply to off-board devices, such as air power tools, while still retaining compressor and turbine design characteristics for efficient vehicle propulsion with the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is shown to scale, although other relative dimensions may be used, if desired.

DETAILED DESCRIPTION

The following description relates to systems and methods for use of engine air (a lower pressure source of air), with a mechanical air multiplier (also referred to as a pressure booster) to deliver high pressure air to an integrated air storage tank of the vehicle. The higher pressure air is supplied at a proportionately reduced flow rate compared to the lower pressure air sourced from the engine air induction and boosting system. In some examples, the input air drives a piston in a cylinder with a large diameter compared to the driven or compressed cylinder. The driven cylinder has higher pressure, but the lesser volume per stroke of the cylinder thereby resulting in less flow.

As described herein, an integrated vehicle system is provided, including specific engine and vehicle controls to enable effective supply of higher pressure air during an "air to the box" mode of vehicle operation, while also monitoring system integrity and taking default action in response to identified degradation of the system and/or components. Further, a seamless integration is provided for transitioning into and out of the "air to the box" vehicle mode while still enabling effective and efficient use of the air induction system during vehicle driving operation. Likewise, during vehicle moving and driving operation, the high pressure air is locked out to discourage use while operating the vehicle and reduce degraded engine performance during vehicle traveling.

Figure 1:
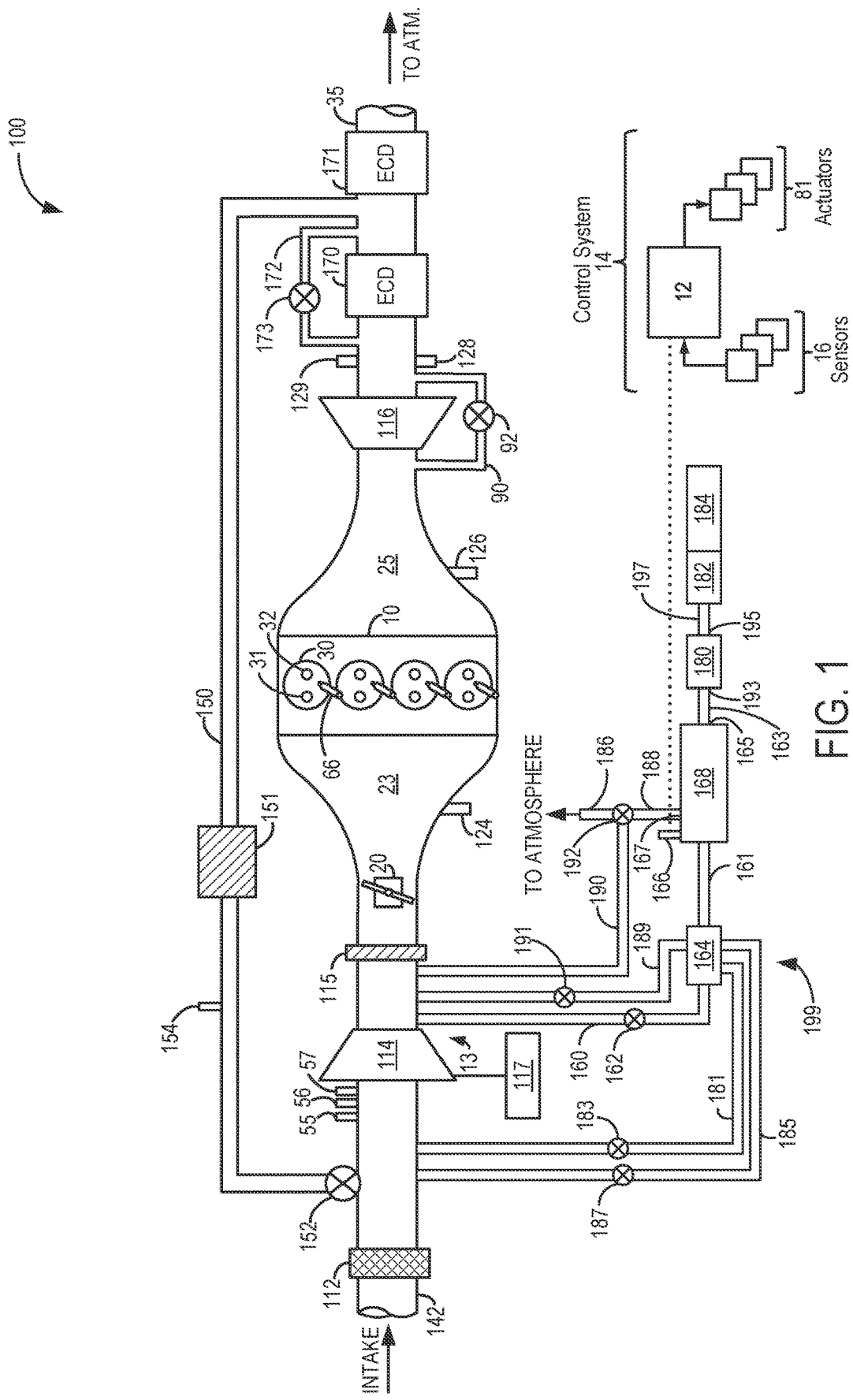
FIG. 1 schematically shows a vehicle including a pressure booster configured to flow pressurized gases to an accumulator.

Referring to FIG. 1, an example engine system 100 is schematically shown. In the depicted embodiment, engine 10 is a boosted engine coupled to a turbocharger 13 including a compressor 114 driven by a turbine 116. Specifically, fresh air is introduced along intake passage 142 into engine 10 via air cleaner 112 and flows to compressor 114.

In some examples, compressor 114 may be an electrically-actuated intake-air compressor that can be driven by actuating electric motor 117 (e.g., the compressor may be configured as a motor-driven or driveshaft-driven supercharger compressor). In other examples, compressor 114 may be a turbocharger compressor mechanically coupled to turbine 116 via a shaft (not shown), with the turbine 116 configured to be driven by expanding engine exhaust gas. Further, in some examples, compressor 114 may be configured to be selectively driven by electric motor 117, turbine 116, or both. In one embodiment, the compressor and turbine may be coupled within a twin scroll turbocharger. In another embodiment, the turbocharger may be a variable geometry turbocharger (VGT), where turbine geometry is actively varied as a function of engine speed.

Compressor 114 is fluidly coupled through charge-air cooler (CAC) 18 (herein also referred to as an intercooler) to throttle valve 20. Throttle valve 20 is fluidly coupled to engine intake manifold 23 (e.g., throttle valve 20 is configured to flow fluid, such as intake air, to the engine intake manifold 23). The pressure of the air charge within the intake manifold may be sensed by manifold air pressure (MAP) sensor 124. From the compressor, the compressed air charge flows through charge-air cooler (CAC) 115 and the throttle valve 20 to the intake manifold 23. Since compression of intake air by compressor 114 may result in an increased temperature of the compressed air relative to air that has not been compressed by compressor 114, CAC 115 is provided downstream of compressor 114 so that boosted intake aircharge can be cooled prior to delivery to the engine intake manifold 23. The CAC 114 may be an air-to-water heat exchanger, in some examples.

One or more sensors may be coupled to an inlet of compressor 114. For example, a temperature sensor 55 may be coupled to the inlet for measuring a temperature of the inlet of compressor 114, and a pressure sensor 56 may be coupled to the inlet for measuring a gas pressure at the inlet of compressor 114. As another example, a humidity sensor 57 may be coupled to the inlet for estimating a humidity of aircharge entering the compressor 114. Still other sensors may include, for example, air-fuel ratio sensors, etc. In other examples, one or more of the compressor inlet conditions (such as humidity, temperature, pressure, etc.) may be inferred (e.g., estimated) based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

Intake manifold 23 is coupled to a series of combustion chambers 30 of engine 10 through a series of intake valves, such as intake valve 31. The combustion chambers are further coupled to exhaust manifold 25 via a series of exhaust valves, such as exhaust valve 32. In the depicted embodiment, a single exhaust manifold 25 is shown. However, in other embodiments, the exhaust manifold may include a plurality of exhaust manifold sections. Configurations having a plurality of exhaust manifold sections may enable effluent from different combustion chambers to be directed to different locations in the engine system.

Each combustion chamber, such as combustion chamber 30, may be supplied one or more fuels, such as gasoline, alcohol fuel blends, diesel, biodiesel, compressed natural gas, etc., via a respective fuel injector, such as fuel injector 66 (shown coupled to combustion chamber 30). Fuel may be supplied to the combustion chambers via direct injection, port injection, throttle valve body injection, or any combination thereof. In the combustion chambers, combustion may be initiated via spark ignition and/or compression ignition.

Exhaust from the one or more exhaust manifold sections may be directed to turbine 116 to drive the turbine. When reduced turbine torque is desired, a portion of the exhaust gas from engine 10 may be directed instead through wastegate 90, bypassing the turbine. In some examples, all of the exhaust gas from engine 10 may be directed through wastegate 92 via bypass passage 90. The combined flow from the turbine 116 and the wastegate 92 may then flow through emission control device (ECD) 170. In some examples, the engine system 100 may include an additional emission control device 171 positioned downstream of ECD 170. A wastegate 173 disposed within bypass passage 172 may controlled (e.g., opened and/or closed) in order to adjust an amount of exhaust gas bypassing the ECD 170 and flowing to ECD 171. The ECD 170 and ECD 171 may include one or more exhaust after-treatment catalysts configured to catalytically treat the exhaust flow, and thereby reduce an amount of one or more substances in the exhaust flow. For example, one exhaust after-treatment catalyst may be configured to trap NOx from the exhaust flow when the exhaust flow is lean, and to reduce the trapped NOx when the exhaust flow is rich. In other examples, an exhaust after-treatment catalyst may be configured to disproportionate NOx or to selectively reduce NOx with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control device 171 may be released into the atmosphere via exhaust conduit 35. Depending on operating conditions, however, a portion of the exhaust residuals may be diverted instead to EGR passage 150, through EGR cooler 151 and EGR valve 152, and to the inlet of compressor 114. EGR passage 150 may be positioned downstream of ECD 170 and upstream of ECD 171, in some examples. In the depicted example, EGR passage is shown fluidly coupled to the inlet of compressor 114. In other examples, EGR passage 150 may be arranged differently (e.g., positioned upstream of ECD 170 and ECD 171), and/or engine system 100 may include additional EGR passages which may be arranged differently relative to EGR passage 150. For example, EGR passage 150 is shown configured to flow exhaust residuals from a location downstream of emission control device 170 to a location upstream of compressor 114. It will be appreciated that in alternate examples, EGR passage 150 may be configured to flow exhaust residuals from a location upstream of emission control device 170. EGR passage 150 is configured as a low pressure EGR passage coupling the engine exhaust manifold, downstream of the turbine 116, with the engine intake manifold, upstream of compressor 114. In some examples, engine system 100 may additionally or optionally include a high pressure EGR system coupling the engine exhaust manifold, upstream of the turbine 116, with the engine intake manifold, downstream of compressor 114.

EGR valve 152 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. In some examples, EGR valve 152 is a continuously variable valve, and in other examples, EGR valve 152 is an on/off valve. The rotation of the compressor 114, in addition to the LP-EGR flow path in engine system 10, may provide homogenization of the exhaust gas into the intake air charge. Further, the disposition of EGR take-off and mixing points may provide cooling of the exhaust gas for increased available EGR mass and increased engine performance.

EGR cooler 151 may be coupled to EGR passage 150 for cooling EGR delivered to the compressor 114. In addition, one or more sensors may be coupled to EGR passage 150 for providing details to control system 14 regarding the composition and condition of the EGR (e.g., measuring and/or estimating the composition and/or condition of the EGR gas). For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 154 (which may be referred to herein as an EGR sensor) may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine intake air dilution (e.g., mixing of intake air with exhaust gas).

Engine system 100 further includes control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 154. Other sensors such as additional pressure, temperature, air/fuel ratio, and composition sensors may be coupled to various locations in engine system 100. The actuators 81 may include, for example, throttle 20, EGR valve 152, wastegate 92, wastegate 173, and fuel injector 66. The control system 14 includes an electronic controller 12. The controller 12 may receive input data from the various sensors, process the input data, and trigger various actuators in response to the processed input data based on instruction or code programmed therein corresponding to one or more routines. The controller 12 receives signals from the various sensors of FIG. 1 and employs the various actuators of FIG. 1 to adjust engine operation based on the received signals and instructions stored on a memory of the controller. For example, the controller 12 may receive signals from compressor inlet pressure sensor 56 and employ an actuator of throttle 20 in order to adjust the position of the throttle (e.g., the amount of opening of the throttle 20) to adjust engine speed based on the compressor inlet pressure.

In some examples, engine system 100 may be included in a hybrid vehicle with multiple sources of torque available to one or more vehicle wheels. For example, torque may be provided to the vehicle wheels via an output of engine 10, and during some conditions, an electric machine (e.g., electric motor) may provide torque to the vehicle wheels in addition to (or instead of) torque provided to the wheels by engine 10. The electric machine may be a motor or a motor/generator, in some examples. A crankshaft of the engine 10 and the electric machine may be connected via a transmission to the vehicle wheels when one or more clutches are engaged. For example, a first clutch may be provided between the crankshaft and the electric machine, and a second clutch may be provided between the electric machine and the transmission. Controller 12 may send a signal to an actuator of each clutch to engage or disengage the clutch, so as to connect or disconnect the crankshaft from the electric machine and the components connected thereto, and/or connect or disconnect the electric machine from the transmission and the components connected thereto. The transmission may be a gearbox, a planetary gear system, or another type of transmission. The powertrain may be configured in various manners including as a parallel, a series, or a series-parallel hybrid vehicle. The electric machine may receive electrical power from a traction battery to provide torque to the vehicle wheels, in some examples. The electric machine may also be operated as a generator to provide electrical power to charge the traction battery, for example, during a braking operation.

Engine system 100 further includes a pressurized gas system 199 including an accumulator 168 configured to receive and store intake gases flowing from intake passage 142 toward engine 10. In particular, accumulator 168 is configured to receive compressed intake air flowing from compressor 114 via passage 160 arranged downstream of the compressor 114. Passage 160 is fluidly coupled to air pressure booster 164 via valve 162 (which may be referred to herein as an accumulator intake valve or flow control valve), with air pressure booster 164 fluidly coupled to accumulator 168 via passage 161. Air pressure booster 164 is configured to increase a pressure of gases (e.g., intake air) flowing from compressor 114. For example, compressor 114 may receive intake gases at a first pressure (e.g., atmospheric pressure) via intake passage 142, and compressor 114 may increase the pressure of the intake gases to a second pressure (e.g., 8 PSI above atmospheric pressure). The intake gases at the second pressure may flow from compressor 114 to pressure booster 164 via passage 160, and pressure booster 164 may further increase the pressure of the intake gases to at least a higher, third pressure (e.g., 100 PSI). The intake gases at the third pressure (or above the third pressure) may then flow to the accumulator 168 and may be stored within the accumulator 168 for later use (as described further below).

Pressure booster 164 may be configured to reduce a flow velocity of intake gases flowing to the pressure booster 164 via passage 160 in order to increase the pressure of the intake gases. As one example, intake gases may flow from compressor 114 to engine 10 at a higher, first flow rate, and intake gases may flow from compressor 114 through pressure booster 164 at a slower, second flow rate. By reducing the flow velocity of the intake gases, the pressure booster 164 increases the pressure of the intake gases. Similar to the example shown by FIG. 2 and described further below, the pressure booster 164 may include a piston having a larger, first end driven by the pressure of intake gases flowing into the pressure booster 164 via passage 160, and a smaller, second end configured to compress gases at an outlet of the pressure booster. The increased pressure of the intake gases at the first end may drive the piston to compress air at the outlet end of the pressure booster 164, increasing the pressure of the gases at the outlet end to at least the third pressure. The gases may then flow from the outlet end to the accumulator 168, where the gases may be stored within the accumulator 168.

Pressure booster 164 may be fluidly coupled to a plurality of passages routing to various locations upstream and downstream of compressor 114, and the pressure of gases within interior chambers of the pressure booster 164 may be controlled by respective valves of the plurality of passages in order to provide a pressure differential across opposing ends of the piston of the pressure booster 164 to drive the piston within the pressure booster 164 (e.g., to increase the pressure of air at the outlet end of the pressure booster 164). In the example shown by FIG. 1, pressure booster 164 is fluidly coupled to intake passage 142 upstream of the compressor 114 by each of passage 181 having valve 183 disposed therein and passage 185 having valve 187 disposed therein. For example, passage 181 may fluidly couple a first chamber of the pressure booster 164 at a first side of a crown of the piston of the pressure booster 164 to intake passage 142 upstream of compressor 114, and passage 185 may fluidly couple a second chamber of the pressure booster 164 at a second side of the crown of the piston to intake passage 142 upstream of compressor 114. Further, the second chamber of the pressure booster 164 at the second side of the crown of the piston may be fluidly coupled to intake passage 142 downstream of the compressor 114 via passage 189 having valve 191 disposed therein. The valves 162, 183, 189, and/or 191 may be opened and/or closed (e.g., selectively or passively) in order to adjust the pressure differential across the crown of the piston (e.g., the relative pressure of gases at the first side and second side of the crown of the piston). By controlling the pressure differential across the piston of the pressure booster 164, the piston may be driven to increase the pressure of gases at the outlet end of the pressure booster 164 (e.g., gases flowing from the pressure booster 164 to the passage 161).

The accumulator 168 may be a vessel (e.g., a reservoir) configured to store gases output by the pressure booster 164 at a high pressure relative to atmospheric pressure. For example, gases within the accumulator 168 may be stored at pressures between 100 PSI and 110 PSI above atmospheric pressure in some examples. The accumulator 168 may include a pressure sensor 166 coupled in electronic communication with the controller 12 of control system 14 and configured to detect (e.g., measure) the pressure of gases stored within the accumulator 168. Accumulator 168 includes a main outlet which may be fluidly coupled to pressure regulator 180 by passage 163. Accumulator 168 may additionally include a vent outlet 167 configured to flow gases from the accumulator 168 to atmosphere and/or intake passage 142. For example, vent outlet 167 is shown by FIG. 1 fluidly coupled to valve 192 (which may be referred to herein as an accumulator vent valve) by passage 188, where valve 192 may be fluidly coupled to atmosphere via passage 186 and/or fluidly coupled to intake passage 142 via passage 190.

Valve 192 may be a three-way valve that may be adjusted to a plurality of different opened or closed positions. For example, valve 192 may be electronically coupled to controller 12 of control system 14, and controller 12 may transmit signals (e.g., electronic signals) to an actuator of valve 192 in order to adjust the position of valve 192 (e.g., adjust the amount of opening of valve 192). As one example, controller 12 may adjust valve 192 to a closed position in which gases do not flow from the accumulator 168 to atmosphere or to the intake passage 142 via the vent outlet 167. As another example, controller 12 may adjust valve 192 to a first opened position in which gases flow from the accumulator 168 via vent outlet 167 to atmosphere (e.g., gases flow from vent outlet 167, through passage 188, through valve 192, and through passage 186 to atmosphere), but gases do not flow from the accumulator 168 to the intake passage 142 (e.g., valve 192 is closed to passage 190). As another example, controller 12 may adjust valve 192 to a second opened position in which gases flow from the accumulator 168 via vent outlet 167 to the intake passage 142 (e.g., gases flow from vent outlet 167, through passage 188, through valve 192, and through passage 190 to the intake passage 142), but gases do not flow from the accumulator 168 directly to atmosphere (e.g., valve 192 is closed to passage 186). As yet another example, controller 12 may adjust valve 192 to a third opened position in which gases flow from the accumulator 168 via vent outlet 167 to both of atmosphere (e.g., gases flow from vent outlet 167, through passage 188, through valve 192, and through passage 186 to atmosphere) and the intake passage 142 (e.g., gases flow from vent outlet 167, through passage 188, through valve 192, and through passage 190 to the intake passage 142). In each example, the amount of opening of the valve 192 may be adjusted to a plurality of positions between fully opened and fully closed in order to control an amount of gases flowing from the accumulator 168 to the intake passage 142 and/or atmosphere. For example, an amount of opening of valve 192 to passage 190 may be greater than an amount of opening of valve 192 to passage 186, or vice versa (e.g., valve 192 may be adjusted to be in a fully opened position to passage 190 and a partially opened position to passage 186, or vice versa). In some examples, valve 192 may function as an automatic pressure-relief valve configured to automatically open (e.g., open without electronic actuation and without receiving signals from controller 12) to atmosphere and/or intake passage 142 responsive to a pressure of gases within accumulator 168 exceeding a threshold pressure (e.g., 115 PSI). Valve 192 may be a normally-closed valve configured to maintain gases within the accumulator 168 by sealing the vent outlet 167 during normal operating conditions (e.g., conditions in which the valve is not electronically opened by controller 12 and/or automatically opened due to the pressure of gases within the accumulator 168 exceeding the threshold pressure).

The main outlet 165 of the accumulator 168 may be fluidly coupled to an inlet 193 of pressure regulator 180 via passage 163, with the pressure regulator 180 configured to adjust a pressure of gases received from the accumulator 168 to a desired output pressure (e.g., 90 psi). For example, during some conditions (e.g., conditions in which air is concurrently provided to the accumulator 168 via pressure booster 164 and passage 161 and air flows out of the accumulator 168 via main outlet 165 and passage 163), the pressure of gases within the accumulator 168 may be increasing and/or decreasing based on a difference between a mass flow rate of gases into the accumulator 168 and a mass flow rate of gases out of the accumulator 168. The pressure regulator 180 may adjust the pressure of gases received from the accumulator 168 to the desired output pressure (e.g., with the desired output pressure set by an operator, such as a driver or user of the engine system 100) even during conditions in which the pressure of gases stored within the accumulator 168 may fluctuate. In some examples, the desired output pressure may be a pressure suitable for operation of a pneumatic device (e.g., pneumatically driven tool), as described below.

An outlet 195 of pressure regulator 180 is fluidly coupled to an output end 182 of passage 197. In some examples, passage 197 may be a hose or tubing, and output end 182 may be a collet or other type of chuck configured to couple to a pneumatically-driven accessory device 184 (which may be referred to herein as a pneumatic tool or pneumatic device, such as a pneumatically-driven grinder). The output end 182 may be normally closed such that gases do not flow from the accumulator 168 out of the output end 182 without input (e.g., actuation) provided by the operator to a switch or other device (e.g., button, handle, etc.) coupled to the output end 182 or pneumatic tool 184. As one example, the pneumatic tool 184 may be a pneumatically-driven fastener driver (e.g., a drill), and the operator may apply input to an actuator of the fastener driver (e.g., depress a handle of the fastener driver) in order to unseal the output end 182 and flow pressurized air from accumulator 168 to the fastener driver 184 to drive the fastener driver (e.g., rotate a drive end of the fastener driver via the pressurized air routed to an inlet of the fastener driver).

In some examples, the pressure regulator 180 may include a valve configured to fluidly isolate the main outlet 165 of the accumulator 168 from the output end 182 during conditions in which delivery of pressurized air from the pressure regulator 180 to the output end is not desired (e.g., conditions in which input is not applied to the pneumatic device 184 by the operator as described above). The controller 12 may transmit signals (e.g., electronic signals) to an actuator of the valve of the pressure regulator 180 in order to adjust a position of the valve (e.g., adjust the valve to a fully closed position, a fully opened position, or a plurality of positions between the fully closed position and fully opened position). For example, adjusting the valve to the fully opened position or a partially opened position may provide pressurized air from the accumulator 168 to the output end 182 via the pressure regulator 180, and adjusting the valve to the fully closed position may fluidly isolate the output end 182 from the accumulator 168 such that gases do not flow from the accumulator 168 to the output end 182 via the pressure regulator 180.

By flowing gases (e.g., intake air) through pressure booster 164 for storage within accumulator 168, and providing the pressurized gases via pressure regulator 180 to output end 182, the pneumatic tool 184 may be coupled to output end 182 in order to be driven by the pressurized gases from accumulator 168. In this configuration, pressurized air is provided for operation of the pneumatic tool 184 by supplying the accumulator 168 with intake gases flowing from compressor 114, where compressor 114 is configured to provide charge air to engine 10. Accumulator 168 acts as a source of pressurized gases for operation of pneumatic tool 184 without the inclusion of additional compressors (e.g., an additional electrical compressor, gasoline-powered compressor, natural gas-powered compressor, or other type of compressor) within engine system 100. In particular, the pressurized gas system 199 may be retrofit to engine systems including a compressor configured to deliver charge air to the engine (e.g., similar to compressor 114) in order to provide pressurized air for operation of one or more pneumatic tools without an additional air compressor.

By storing pressurized gas within the accumulator 168 via pressure booster 164 and compressor 114, with compressor 114 further configured to provide charge air to engine 10 (e.g., as a compressor of turbocharger 13), a cost of engine system 100 and a cost of operation of pneumatic tool 184 may be reduced (e.g., due to inclusion of only compressor 114, and no additional compressors, configured to provide pressurized air to drive pneumatic tool 184). Further, additional compressors may increase a size, weight, and/or electrical load of the engine system 100. By providing the pressurized gas system 199 as described above, the pneumatic tool 184 may be driven (e.g., powered) without additional compressors, resulting in decreased size, weight, and/or electrical load of the engine system, and increasing a convenience of operation of the pneumatic tool 184 (e.g., by reducing loading and/or unloading of additional compressors to/from the vehicle by the operator, where the vehicle includes engine system 100).

Figure 2:
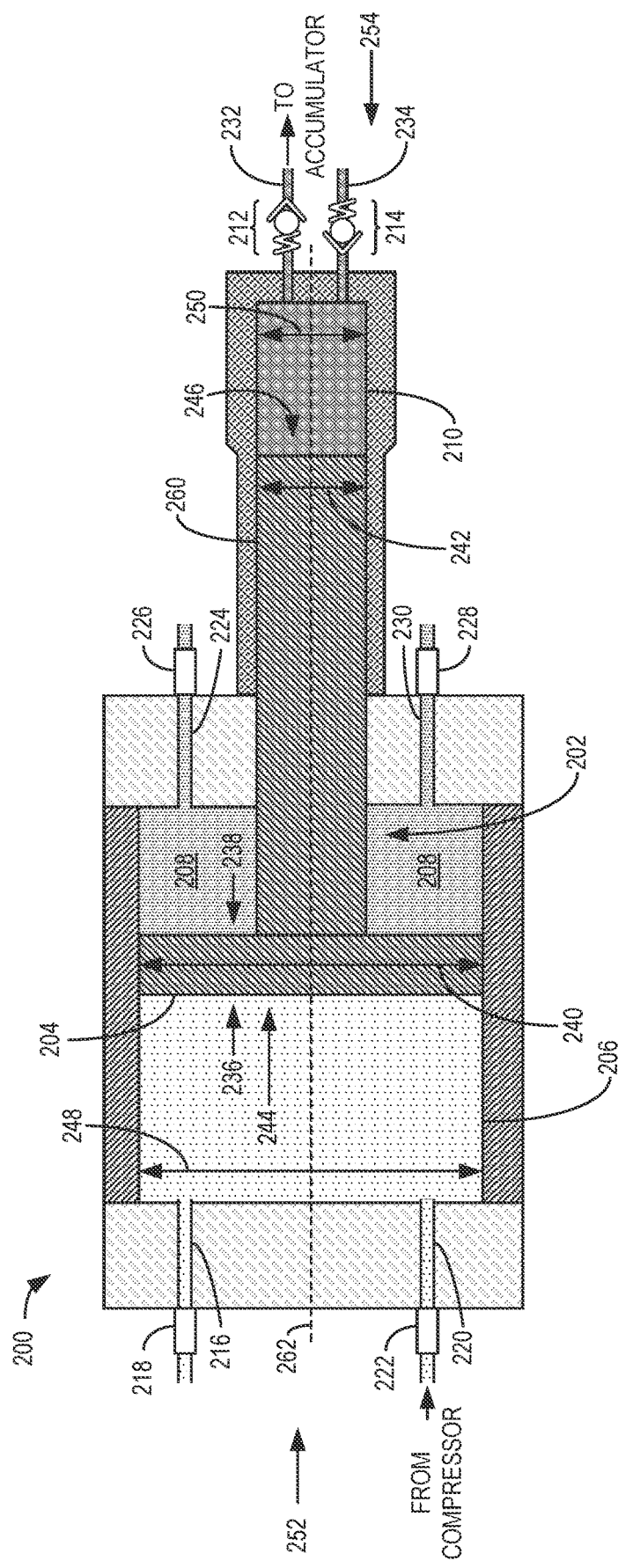
FIG. 2 shows a cross-sectional view of a pressure booster of a vehicle.

Referring to FIG. 2, a cross-sectional view of a pressure booster 200 is shown. The pressure booster 200 may be similar to (or the same as) pressure booster 164 shown by FIG. 1 and described above. Pressure booster 200 may provide pressurized air to an accumulator of a pressurized air system of an engine system, where the engine system, pressurized air system, and accumulator may be similar to (or the same as) engine system 100, pressurized gas system 199, and accumulator 168, respectively, shown by FIG. 1 and described above.

The pressure booster 200 includes a plurality of chambers arranged within an interior of the pressure booster 200. For example, pressure booster 200 includes a first chamber 206 and a second chamber 208 arranged toward an inlet end 252 of the pressure booster 200, and a third chamber 210 arranged toward an outlet end 254 of the pressure booster 200. The interior of the pressure booster 200 further incudes a piston 202 disposed therein. The piston 202 includes a first end 244 arranged toward the inlet end 252 of the pressure booster 200 and a second end 246 arranged toward the outlet end 254 of the pressure booster 200. A crown of the piston 202 is arranged between the first chamber 206 and second chamber 208 at the first end 244 of the piston 202 and fluidly separates the first chamber 206 from the second chamber 208. Specifically, first chamber 206 is arranged at first side 236 of crown 204, and second chamber 208 is arranged at second side 238 of crown 204. The first chamber 206 and second chamber 208 may each have approximately a same length 248 in a direction perpendicular to a shaft 260 of the piston 202 (e.g., with length 248 extending in a radial direction relative to axis 262 along which the piston 202 may travel), and crown 204 may have a length 240 in the same direction, where the length 248 is approximately equal to the length 240 (e.g., the length 248 may be the same as the length 240). In this configuration, the crown 204 reduces a likelihood of gas flow from the first chamber 206 to the second chamber 208 (and vice versa).

The third chamber 210 is positioned at the outlet end 254 of pressure booster 200 and is fluidly separated from each of the first chamber 206 and second chamber 208 by the shaft 260 of the piston 202. The shaft 260 is disposed within the third chamber 210. A length 242 of the shaft 260 in the radial direction of axis 262 is approximately the same (e.g., a same amount of length) as a length 250 of third chamber 210 in the radial direction of axis 262, where piston 202 is configured to move within the pressure booster 200 along axis 262.

The pressure booster 200 is configured to receive gas (e.g., intake air) at a lower, first pressure and a higher, first flow rate, and output the gas at a higher, second pressure and lower, second flow rate. For example, the pressure booster 200 may receive intake air from an intake passage of the engine system (e.g., intake passage 142 shown by FIG. 1 and described above) at the higher, first flow rate via passage 220 and valve 222 (e.g., similar to passage 160 and valve 162 shown by FIG. 1 and described above). The intake air received by the pressure booster 200 may flow into first chamber 206 within the interior of the pressure booster 200. The crown 204 is disposed at the inlet end 252 of the pressure booster 200, between the first chamber 206 and the second chamber 208, such that air flowing into the first chamber 206 may act against the crown 204 (e.g., apply force to the crown 204). As the intake air flows into the first chamber 206, the pressure of the intake air may drive the piston 202 toward the outlet end 254 of the pressure booster 200. As a result, the crown 204 moves toward the outlet end 254, increasing a volume of the first chamber 206 and decreasing a volume of the second chamber 208. Further, the driving the piston 202 toward the outlet end 254 moves the shaft 260 further into the third chamber 210 (e.g., presses the second end 246 of the piston 202 through the third chamber 210 and toward the outlet end 254 of the pressure booster 200), reducing a volume of the third chamber 210 and increasing a pressure of gases within the third chamber 210. In some examples, the pressure booster 200 may increase the pressure of gas within the third chamber 210 to a pressure above 100 psi. The pressurized gas within the third chamber 210 may flow from the third chamber 210 to the accumulator (e.g., accumulator 168 shown by FIG. 1 and described above) via outlet passage 232 (e.g., similar to passage 163 shown by FIG. 1 and described above). Outlet passage 232 may include check valve 212 configured to flow gas toward the accumulator and to reduce a likelihood of gas flow from the accumulator to the third chamber 210 via outlet passage 232. The pressurized gas flowing to the accumulator from pressure booster 200 may be stored within the accumulator for use by an operator of the vehicle (e.g., to power a pneumatically-driven device, such as pneumatic tool 184 shown by FIG. 1 and described above).

In order to reverse the motion of the piston 202 to increase the volume of the second chamber 208 and the volume of the third chamber 210 and decrease the volume of the first chamber 206 (e.g., to flow additional air into the third chamber 210 for compression by piston 202), the pressure booster 200 includes a plurality of passages including valves configured to open and/or close to adjust the flow of gases to/from the pressure booster 200. For example, a flow of gas from first chamber 206 may be controlled by valve 218 coupled to passage 216, a flow of gas to second chamber 208 may be controlled by valve 228 coupled to passage 230, and a flow of gas from second chamber 208 may be controlled by valve 226 coupled to passage 224, where passage 216 is fluidly coupled to first chamber 206, and passage 230 and passage 226 are fluidly coupled to second chamber 208. The valves 218, 222, 226, and 230 may be electronically actuated valves controlled by an electronic controller of the engine system, in some examples (e.g., controller 12 of control system 14 shown by FIG. 1 and described above. In some examples, valve 218, valve 222, valve 226, and valve 230 may be similar to valve 183, valve 162, valve 187, and valve 191, respectively, shown by FIG. 1 and described above.

In an example operation of the pressure booster 200, the controller may open the valve 222 and close the valve 218 in order to flow air into the first chamber 206 via passage 220. The controller may additionally open valve 226 and close valve 228 in order to flow air out of the second chamber 208. The resulting pressure differential across the crown 204 of the piston 202 causes the piston to move toward the outlet end 254 of the pressure booster 200 along axis 262, and the second end 246 of the piston 202 presses through the third chamber 210 and increases the pressure of air within the third chamber 210 (e.g., boosts the pressure of the air). The air having the increased pressure (which may be referred to herein as pressurized air) due to the motion of the piston 202 may flow out of the third chamber 210 and into the accumulator via passage 232, where the pressurized air is stored. To move the piston 202 back toward the inlet end 252 of the pressure booster 200, the controller may close valve 226 and open valve 228 in order to flow air into the second chamber 208. The controller may additionally close valve 222 and open valve 218 in order to flow air out of the first chamber 206. The resulting pressure differential between the first chamber 206 and second chamber 208 causes the piston 202 to move toward the inlet end 252. As the piston moves toward the inlet end 252, air may flow into the third chamber 210 via passage 234, with the passage 234 including check valve 214 to reduce a likelihood of air flow out of the third chamber 210 via passage 234. By repeatedly moving the piston toward the outlet end 254 and away from the outlet end 254 as described above, the pressure booster 200 receives air and pressurizes the air for delivery to the accumulator. In some examples, third chamber 210 may receive air from an intake passage of the engine downstream of a compressor (e.g., air may flow into third chamber 210 via passage 234 from intake passage 142 of engine 10 at a location downstream of compressor 114, with the intake passage 142, engine 10, and compressor 114 shown by FIG. 1 and described above), where the air is then pressurized (e.g., the pressure of the air is increased) by movement of the second end 246 of the piston 202 toward the outlet end 254 as described above. In other examples, third chamber 210 may receive air from a different source. As one example, the third chamber 210 may receive exhaust gases from an exhaust gas source, such as exhaust manifold 25 and/or one or more exhaust passages. The exhaust gases may be pressurized as a result of the movement of the piston 202 as described above. Further, in some examples, the exhaust gases may mix and/or converge within the third chamber 210 with the air from downstream of the compressor, such that the piston 202 pressurizes the mixture of air and exhaust gases. In yet other examples, the third chamber 210 may receive air from a different air source of the vehicle, such as an HVAC blower motor and/or an output of a vacuum generating electric motor, and the air may be pressurized by the piston 202 as described above.

Figure 3:
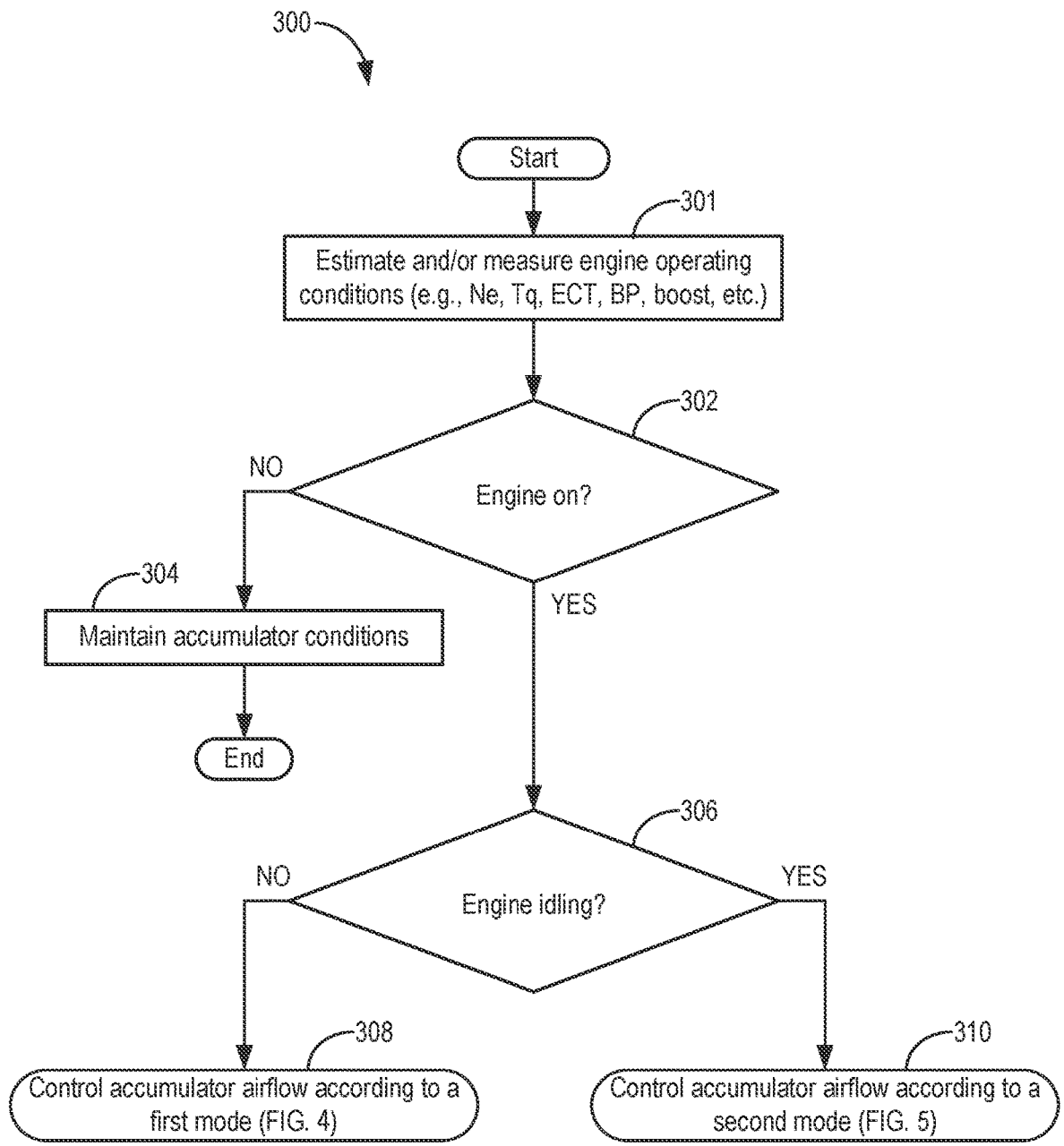
FIG. 3 shows a flowchart illustrating a method for controlling an airflow of an accumulator of a vehicle.

Referring to FIG. 3, a flowchart illustrating a method 300 for controlling an airflow of an accumulator of a vehicle is shown. The accumulator of method 300 may be similar to (or the same as) the accumulator 168 shown by FIG. 1 and described above. Instructions for carrying out method 300 and the rest of the methods included herein may be executed by a controller (e.g., controller 12 of control system 14 shown by FIG. 1 and described above) based on instructions stored on a memory of the controller and in conjunction with signals received from sensors of the engine system, such as the sensors 16 described above with reference to FIG. 1. The controller may employ engine actuators of the engine system, such as the actuators 81 described above with reference to FIG. 1, to adjust engine operation according to the methods described below.

Engine operating conditions are estimated and/or measured at 301. Engine operating conditions may include engine speed, engine intake air flow, engine intake air pressure, emissions control device temperature, spark timing, combustion rate, fuel flow rate, exhaust gas temperature, exhaust gas flow, throttle position, intake air humidity, compressor speed, turbocharger turbine speed, etc. Engine operating conditions may also include one or more parameters such as gas pressure of the accumulator (e.g., a pressure of gases within an interior of the accumulator, such as a pressure of intake air and/or other gases stored within the accumulator), a position of one or more valves (e.g., a position of an intake valve of the accumulator, such as valve 162 shown by FIG. 1 and described above), engine operating mode, air flow rate to the accumulator, gas flow rate from the accumulator, intake air flow rate to a pressure booster disposed upstream of the accumulator (such as pressure booster 164 shown by FIG. 1 and described above), EGR gas flow rate, etc. Signals may be received at the electronic controller of the engine (e.g., controller 12 shown by FIG. 1 and described above) from various sensors of the engine (e.g., temperature sensors such as temperature sensor 55 shown by FIG. 1 and described above, pressure sensors such as pressure sensor 56, humidity sensors such as humidity sensor 57, etc.), and the electronic controller may estimate and/or measure the engine operating conditions based on the signals. In some examples, the controller may calculate engine operating conditions based on the signals (e.g., using one or more lookup tables stored in non-transitory memory of the controller), and in some examples the controller may infer the engine operating conditions based on the signals (e.g., via logic, such as one or more algorithms stored in the non-transitory memory of the controller). For example, the controller may compare an output signal of a temperature sensor to values stored within a lookup table to determine the temperature measured by the temperature sensor.

A determination of whether the engine is on is made at 302. The controller may determine whether the engine is on based on the estimated and/or measured engine operating conditions. For example, the determination of whether the engine is on may include determining whether fuel is delivered to one or more cylinders of the engine, whether fuel/air charge is combusted within one or more of the engine cylinders, whether spark is initiated by one or more spark plugs disposed within engine cylinders, whether the vehicle including the engine is in motion (e.g., whether one or more wheels of the vehicle are rotating), etc. As one example, conditions in which the engine is on may include combustion of fuel/air within the engine cylinders, exhaust gas flow from the engine cylinders, etc. Conditions in which the engine is not on may include ignition key-off, no combustion of fuel/air within engine cylinders, no exhaust flow from engine cylinders, etc.

If the engine is not on at 302, accumulator conditions are maintained at 304. Maintaining accumulator conditions may include not adjusting one or more valves configured to flow gases to and/or from the accumulator (e.g., maintaining a position of the one or more valves), not flowing air to the accumulator from the pressure booster, not delivering air from the accumulator to an outlet (e.g., output end 182 shown by FIG. 1 and described above), etc.

If the engine is on at 302, a determination of whether the engine is idling is made at 306. The determination of whether the engine is idling may include comparing the estimated and/or measured engine speed to a threshold engine speed, comparing the vehicle speed to a threshold vehicle speed, etc. For example, the controller may compare the engine speed to the threshold engine speed, and if the engine speed is less than the threshold engine speed, the controller may determine that the engine is idling. In one example, the threshold engine speed may be 1000 RPM. In another example, the controller may determine whether the engine speed is within a threshold range (e.g., between 600 RPM and 1000 RPM), and if the engine speed is within the threshold range, the controller determines that the engine is idling. In other examples, the threshold engine speed may be a different engine speed (e.g., 2000 RPM). The threshold engine speed may be a pre-determined engine speeds stored in the non-transitory memory of the controller. In some examples, the controller may determine whether the engine is idling based on a different engine parameter. For example, the controller may compare a fuel delivery rate to engine cylinders to a threshold fuel delivery rate. The threshold fuel delivery rate may be a pre-determined fuel delivery rate stored in the non-transitory memory of the controller. If the fuel delivery rate is less than the threshold fuel delivery rate, the controller may determine that the engine is idling. In yet other examples, the controller may determine whether the engine is idling based on a different engine parameter such as engine temperature, engine coolant flow rate, crankshaft speed, etc.

If the engine is not idling at 306, accumulator airflow is controlled according to a first mode at 308. Controlling the accumulator air flow according to the first mode may include flowing a portion of boosted intake air to the pressure booster in order to store air within the accumulator while the engine is running and not idling (e.g., the engine speed exceeds the threshold engine speed described above at 306), as described further below with reference to FIG. 4.

If the engine is idling at 306, accumulator airflow is controlled according to a second mode at 310. Controlling the accumulator air flow according to the 2nd mode may include flowing intake air to the pressure booster in order to store air within accumulator while the engine is running and idling (e.g., the engine speed is less than the threshold engine speed described above at 306), as described further below with reference to FIG. 5.

Figure 4:
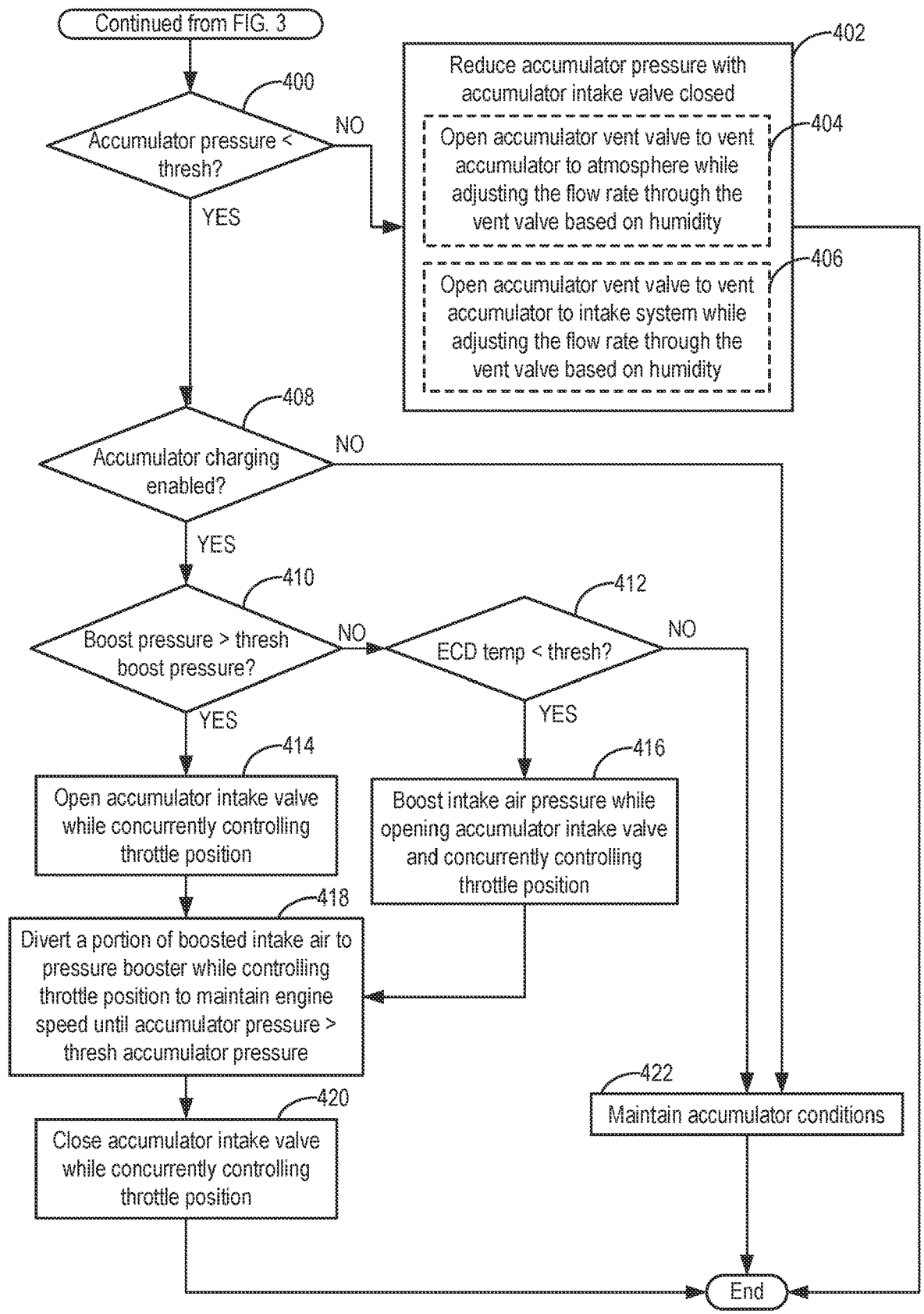
FIG. 4 shows a flowchart illustrating control of airflow of the accumulator in a first mode according to the method of FIG. 3.

Referring firstly to FIG. 4, a continuation of method 300 of FIG. 3 during conditions in which the accumulator airflow is controlled according to the first mode is shown.

A determination of whether the accumulator pressure is less than a threshold pressure is made at 400. The threshold pressure may be a pre-determined pressure based on a desired gas storage pressure of the accumulator and may be the same as the second threshold pressure described further below with reference to FIG. 5. For example, the threshold pressure may be a pressure suitable for long-term storage of gas within the accumulator (e.g., 100 PSI, 110 PSI, etc.). The threshold pressure may be a pressure that is relatively high compared to atmospheric air pressure and storing gases within the accumulator at pressures below the threshold pressure may decrease a likelihood of degradation of the accumulator.

If the accumulator pressure is not less than the threshold pressure at 400, accumulator pressure is reduced with the accumulator intake valve closed at 402. Reducing the accumulator pressure with the accumulator intake valve closed may include flowing gases out of the accumulator while not flowing gases into the accumulator. For example, the controller may adjust a position of an accumulator vent valve in order to decrease the amount of gas stored within the accumulator and reduce the accumulator gas pressure, as described below.

Reducing the accumulator pressure with the accumulator intake valve closed may include opening the accumulator vent valve to vent the accumulator to atmosphere while adjusting the flow rate through the vent valve based on humidity at 404. For example, the accumulator vent valve may be similar to valve 192 shown by FIG. 1 and described above. The accumulator vent valve may be a three-way valve, with an input of the accumulator vent valve fluidly coupled to the accumulator (e.g., an outlet of the accumulator), and with an output of the accumulator vent valve fluidly coupled to atmosphere (e.g., via a passage coupled to the accumulator vent valve output). The controller may adjust an actuator of the accumulator vent valve in order to open the accumulator vent valve to a position in which gases flow from the interior of the accumulator to atmosphere. As one example, the controller may adjust the position of the accumulator vent valve in order to control a flow rate of gases from the accumulator through the accumulator vent valve to atmosphere. For example, the accumulator vent valve may be actuated to a first position in which the accumulator vent valve is fully opened to atmosphere, a second position in which the accumulator vent valve is fully closed to atmosphere, and a plurality of positions between the fully opened position and the fully closed position. Opening the accumulator vent valve to vent the accumulator to atmosphere may include adjusting the accumulator vent valve to the fully opened position, or to one of the plurality of positions between the fully closed position and the fully opened position. The accumulator vent valve may additionally include a second output, and opening the accumulator vent valve to vent the accumulator to atmosphere may include maintaining the second output in a fully closed position (e.g., a position in which gases do not flow from the accumulator through the accumulator vent valve and out of the second output of the accumulator vent valve).

The controller may continually (e.g. gradually and continuously, without interruption) adjust the position of the accumulator vent valve through the plurality of positions in order to control the flow rate of gases from the accumulator through the accumulator vent valve based on a humidity of the gases and/or atmospheric air. For example, the controller may estimate and/or measure the humidity (e.g., water vapor content) of the gases stored within the accumulator and/or the humidity of atmospheric air via one or more humidity sensors. Measuring the humidity of the gases stored within the accumulator may include receiving signals (e.g., electrical signals) from a humidity sensor coupled to the accumulator, and measuring humidity of atmospheric air may include receiving signals from a humidity sensor coupled to the engine (e.g., an intake passage of the engine, a surface within a compartment of the engine, etc.).

Controlling the flow rate of gases from the accumulator through the accumulator vent valve to atmosphere may include controlling the position of the accumulator vent valve based on each of the humidity of the gases stored within the accumulator and the humidity of atmospheric air (e.g., based on a difference between the humidity of the gases stored within the accumulator and the humidity of atmospheric air). As one example, during conditions in which the humidity of the gases stored within the accumulator is greater than the humidity of atmospheric air, the controller may open the accumulator vent valve at a first rate, and during conditions in which the humidity of the gases stored within the accumulator is less than the humidity of atmospheric air, the controller may open the accumulator vent valve at a different, second rate. Controlling the rate of opening of the accumulator vent valve based on the humidity of the gases stored within the accumulator and/or the humidity of atmospheric air may decrease the likelihood of condensation formation at the outlet of the accumulator and/or within the interior of the accumulator. By reducing the likelihood of condensation formation in this way, degradation of the accumulator may be reduced.

The controller may determine the adjustment to the accumulator vent valve (e.g., the rate of opening of the accumulator vent valve) based on the humidity of the gases stored within the accumulator and/or the humidity of atmospheric air using one or more look-up tables and/or algorithms stored in non-transitory memory of the controller. As one example, the controller may determine the difference between the humidity of the gases stored within the accumulator and the humidity of atmospheric air and may control the amount of opening of the accumulator vent valve based on the difference between each humidity, with the difference being an input of the look-up table and with the accumulator vent valve opening rate being an output of the look-up table. As another example, the controller may adjust the accumulator vent valve opening rate via logic stored in non-transitory memory of the controller, with the accumulator vent valve opening rate being a function of the difference between the humidity of the gases stored within the accumulator and the humidity of atmospheric air.

Reducing the accumulator pressure with the accumulator intake valve closed may include opening the accumulator vent valve to vent the accumulator to the intake system while adjusting the flow rate through the vent valve based on humidity at 406. Opening the accumulator vent valve to vent the accumulator to the intake system may occur alone or in combination with opening accumulator vent valve to vent the accumulator to atmosphere, as described above. For example, the second outlet of the accumulator vent valve described above may be fluidly coupled to the intake system of the engine (e.g., an intake passage of the engine, such as intake passage 142 shown by FIG. 1 and described above), and the controller may adjust the position of the accumulator vent valve in order to adjust the amount of opening of the accumulator vent valve to the intake system. The controller may control the amount of opening of the accumulator vent valve to the intake system in order to adjust the flow rate of gases from the accumulator through the accumulator vent valve to the intake system.

Adjustment of the flow rate of gases from the accumulator to the intake system may be based on the humidity of the gases stored within the accumulator and/or the humidity of gases in the intake system (e.g., the humidity of intake air within the intake passage of the intake system). As one example, the controller may adjust the flow rate of the gases from the accumulator to the intake system based on a difference between the humidity of the gases stored within the accumulator and the humidity of gases within the intake system (e.g., a humidity of fresh intake air and/or boost air within the intake system). As one example, during conditions in which the humidity of the gases stored within the accumulator is greater than humidity of gases within the intake system, the controller may open the accumulator vent valve to the intake system at a first rate, and during conditions in which humidity of the gases stored within the accumulator is less than the humidity of the gases within the intake system, the controller may open the cumulative vent valve to the intake system at a different, second rate. Controlling the rate of opening of the accumulator vent valve to the intake system based on the humidity of the gases stored within the accumulator and/or the humidity of the gases within the intake system (e.g., the difference between the humidity of the gases stored within the accumulator and the humidity of the gases within the intake system) may decrease a likelihood of condensation formation at the outlet of the accumulator and/or within the interior of the accumulator and may reduce degradation of the accumulator. The controller may adjust the amount of opening of the accumulator vent valve to the intake system using a look-up table or algorithm, similar to the example described above with reference to flowing gases from the accumulator to atmosphere.

The controller may control the flow rate of gases from the accumulator to the intake system and the flow rate of gases from the accumulator to atmosphere concurrently (e.g., in combination, with a portion of gases from the accumulator flowing to the intake system and a portion of the gases from the accumulator flowing to atmosphere, where the controller controls a ratio of the gases flowing from the accumulator to the intake system to gases flowing from the accumulator to atmosphere). The flow rate of gases from the accumulator to the intake system may be different than the flow rate of gases from the accumulator to atmosphere based on the humidity of the gases stored within the accumulator, the humidity of gases within the intake system, in the humidity of atmospheric air. For example, during conditions in which a difference between the humidity of the gases stored within the accumulator and the humidity of the gases within the intake system is greater than a difference between the humidity of the gases stored within the accumulator and the humidity of atmospheric air, the flow rate of gases from the accumulator to the intake system may be less than the flow rate of gases from the accumulator to atmosphere while the accumulator vent valve is opened to reduce the accumulator pressure. By controlling each of the flow of gases from the accumulator to the intake system and the flow of gases from the accumulator to atmosphere, a likelihood of condensation formation at the accumulator and/or accumulator vent valve may be further reduced.

If the accumulator pressure is less than the threshold pressure at 400, a determination of whether accumulator charging is enabled is made at 408. Determining whether accumulator charging is enabled may include determining whether an operator of the engine (e.g., a driver of the vehicle including the engine) has selected accumulator charging via one or more user interface devices (e.g., switches, buttons, touch screens, etc.). As one example, a cabin of the vehicle in which the operator sits may include a switch or other user interface device configured to enable the operator to select between an engine operating mode in which accumulator charging is enabled and an operating mode in which accumulator charging is not enabled. The user interface device may be electronically coupled to the electronic controller of the engine (e.g., controller 12 shown by FIG. 1 and described above), and the electronic controller may receive signals (e.g., electronic signals) from the user interface device indicating the engine operating mode selected by the operator (e.g., the mode in which accumulator charging is enabled, or the mode in which accumulator charging is not enabled).

As one example, the user interface may be an ON/OFF switch, with the accumulator charging enabled during conditions in which the switch is in the ON position, and with the accumulator charging disabled during conditions in which the switch is in the OFF position. In yet other examples, the electronic controller may automatically select the operating mode of the engine to enable or disable the accumulator charging based on engine operating conditions and without input by the operator. For example, during conditions in which a flow rate of air from the compressor (e.g., compressor 114 shown by FIG. 1 and described above) exceeds a threshold flow rate, the electronic controller may adjust the engine operating mode such that accumulator charging is enabled (e.g., to divert a portion of from the compressor to the pressure booster arranged upstream of the accumulator, similar to pressure booster 164 shown by FIG. 1 and described above). Determining whether accumulator charging is enabled may include determining the selected operating mode of the engine (e.g., determining whether the selected operating mode of the engine includes accumulator charging enabled).

If accumulator charging is not enabled at 408, the accumulator conditions are maintained at 422. Maintaining accumulator conditions may include not adjusting one or more valves configured to flow gases to and/or from the accumulator (e.g., maintaining a position of the one or more valves), not flowing air to the accumulator from the pressure booster, not delivering air from the accumulator to an outlet (e.g., output end 182 shown by FIG. 1 and described above), not adjusting whether the accumulator charging is enabled or disabled, etc.

If accumulator charging is enabled at 408, a determination of whether boost pressure is greater than a threshold is made at 410. The boost pressure refers to a pressure of intake air (e.g., boost air) within intake passages arranged downstream of the compressor of the engine (e.g., compressor 114 shown by FIG. 1 and described above). The boost pressure may be based on engine operating conditions such as an output of the engine in some examples (e.g., engine speed, turbine speed, etc.). For example, during conditions in which the compressor of the engine is driven by a turbine of a turbocharger (e.g., turbine 116 shown by FIG. 1 and described above), the boost pressure may be based on the compressor speed, with the compressor speed being based on the turbine speed. The turbine speed may be based on a flow of exhaust gases to the turbine (e.g., a mass flow rate of exhaust gases from the engine to the turbine), with the flow of exhaust gases to the turbine being based on engine speed. In some examples, the engine may include a wastegate (e.g., wastegate 92 shown by FIG. 1 and described above) configured to bypass exhaust gases from the engine around the turbine, and the flow rate of exhaust gases to the turbine may be based on both the engine speed and the position of the wastegate (e.g., an amount of opening of the wastegate). For higher turbine speeds (e.g., XXX RPM), the compressor speed may be higher which may result in a higher boost pressure (e.g., XXX atm), and for lower turbine speeds (e.g., XXX RPM), the compressor speed may be lower which may result in a lower boost pressure (e.g., XXX atm).

In some examples, the threshold boost pressure may be a pre-determined boost pressure stored in non-transitory memory of the electronic controller. In some examples, the threshold boost pressure may be based on engine load and/or engine torque demand. For example, during conditions in which the engine torque demand is higher, the threshold boost pressure may be higher, and during conditions in which the engine torque demand is lower, the threshold boost pressure may be lower. The threshold boost pressure may correspond to an amount of boost pressure utilized to provide the requested torque output of the engine. As one example, during conditions in which the engine is operating at a cruising speed (e.g., 2000 RPM), the threshold boost pressure may correspond to a boost pressure used to maintain operation of the engine at the cruising speed. Determining whether the boost pressure is greater than the threshold boost pressure may include comparing the boost pressure to the threshold boost pressure, where the threshold boost pressure is the amount of boost pressure used to maintain the operation of the engine at the cruising speed.

During some conditions, the boost pressure may be greater than the threshold boost pressure. For example, during conditions in which the waste gate configured to bypass exhaust gases around the turbine of the turbocharger is in the fully closed position such that no exhaust gases bypast the turbine, the rotation speed of the turbine may result in a relatively high rotation speed of the compressor, which may increase intake boost pressure above the threshold boost pressure. As another example, during conditions in which engine speed is relatively low (e.g., 1500 RPM) and a temperature of exhaust gases output by the engine is relatively high (e.g., a temperature of the engine is relatively high in relation to the current engine speed, such as during conditions following a throttle tip-out), the turbine rotation speed may be relatively high due to expansion of the exhaust gases within the turbine. As a result, the compressor rotation speed may be relatively high, which may increase the boost pressure above the threshold boost pressure. In other examples, the threshold boost pressure may be a pre-determined pressure stored in non-transitory memory of the controller. As one example, the threshold boost pressure may be a boost pressure configured to maintain operation of the engine at one or more typical cruising speeds of the engine (e.g., 2000 RPM, 2500 RPM, etc.).

If the boost pressure is greater than the threshold at 410, the accumulator intake valve is opened while concurrently controlling throttle position at 414. The accumulator intake valve (e.g., similar to valve 162 shown by FIG. 1 and described above) may be opened in order to divert a portion of boosted intake air downstream of the compressor of the engine to the pressure booster.

The pressure booster may deliver pressurized air to the accumulator, similar to the example described above with reference to FIG. 2 (e.g., similar to pressure booster 200 shown by FIG. 2 and described above). For example, the pressure booster may flow pressurized air to the accumulator for storage within an interior of the accumulator, with the pressurized air flowing from the pressure booster to the accumulator being at a higher pressure than the pressurized air flowing from the compressor to the pressure booster. By concurrently controlling a throttle position while opening the accumulator intake valve, the pressure of intake air downstream of the compressor (e.g., boosted intake air) may be maintained above the threshold boost pressure while a portion of the boosted intake air is diverted to the pressure booster. For example, the controller may adjust the amount of opening of the accumulator intake valve (e.g., adjust the position of the accumulator intake valve from the fully closed position through a plurality of partially opened positions), and as the controller adjusts the amount of opening of the accumulator intake valve, the controller concurrently adjusts the amount of opening of the throttle in order to maintain the intake air boost pressure above the threshold boost pressure.

Controlling the throttle position concurrently with the opening of the accumulator intake valve may include increasing and/or decreasing the amount of opening of the throttle responsive to the intake boost pressure. Because a portion of the boosted intake air flows to the pressure booster as the accumulator intake valve is opened, opening the accumulator intake valve without concurrently controlling the throttle position may result in a decrease in the intake boost pressure (e.g., due to a flow of boosted intake air to the pressure booster instead of the engine cylinders). However, by concurrently controlling the throttle position as the accumulator intake valve is opened, the amount of opening of the throttle is adjusted to control the flow of intake air to the compressor, which may offset and/or cancel a reduction in the intake boost pressure resulting from the portion of boosted intake air flowing from the compressor to the pressure booster.

A portion of boosted intake air is diverted to the pressure booster while concurrently adjusting the throttle position to maintain engine speed until the accumulator pressure is at least equal to the threshold pressure at 418 (e.g., the threshold pressure described above at 400). Controlling the throttle position to maintain engine speed while concurrently diverting a portion of boosted intake air to the pressure booster may include maintaining the intake air boost pressure above the threshold boost pressure as described above. For example, in order to maintain the engine speed, the controller may adjust the throttle position such that an amount of intake air flowing to the engine is maintained (e.g., maintained according to engine torque demand or requested engine torque output). As one example, during conditions in which the operator of the engine (e.g., a driver of the vehicle including the engine) initiates a throttle tip-in request (e.g., by pressing a pedal of the vehicle) in order to increase the engine speed, the controller may adjust the position of the throttle in order to provide the requested increase in engine speed while also providing the flow of boosted intake air to the pressure booster.

The position of the throttle may be adjusted to compensate for the flow of boosted intake air diverted to the pressure booster and not to the engine, such that the engine speed is increased or decreased to the requested engine speed or maintained at the requested engine speed as the portion of boosted intake air flows to the pressure booster. For example, during conditions in which a first engine speed is requested and boosted intake air is not diverted to the pressure booster, the controller may adjust the throttle to a first opened position in order to adjust the speed of the engine to the first engine speed. However, during conditions in which the first engine speed is requested and boosted intake air is diverted to the pressure booster as described above, the controller may adjust the throttle to a second opened position to adjust the speed of the engine to the first engine speed and provide boosted intake air to the pressure booster. In some examples, the second opened position may be a position in which the throttle is opened by a greater amount relative to the first opened position.

The portion of boosted intake air is diverted to the pressure booster until the accumulator pressure is at least greater than the threshold accumulator pressure. The threshold accumulator pressure may be a pre-determined pressure corresponding to a desired gas storage pressure of the accumulator and may be the same as the threshold accumulator pressure described above at 400. For example, a volume of the interior of the accumulator may be a fixed volume (e.g., a volume that does not expand and/or contract), and as gas is stored within the interior of the accumulator, a pressure of the gas stored within the accumulator may increase (e.g., due to the amount of gas stored within the accumulator increasing as the volume of the interior of the accumulator is not increased). The threshold accumulator pressure may be based on a pre-determined amount of gases (e.g., mass of gases) to be stored within the accumulator, such that during conditions in which the amount of gases stored within the accumulator is equal to the pre-determined amount of gases, the pressure of gases stored within the accumulator is equal to the threshold accumulator pressure. The pre-determined amount of gases to be stored within the accumulator may correspond to an amount of gases suitable for driving operation of a pneumatic device (e.g., pneumatic tool 184 shown by FIG. 1 and described above) for a pre-determined amount of time (e.g., 5 minutes, 10 minutes, etc.).

As one example, during conditions in which the pressure of gases stored within the accumulator is equal to the threshold accumulator pressure, the amount of gases stored within the accumulator may be equal to the pre-determined amount suitable for driving the operation of the pneumatic device for the pre-determined amount of time. By diverting the boosted intake air to the pressure booster until the accumulator pressure is greater than the threshold accumulator pressure, an amount of gases stored within the accumulator may be equal to the pre-determined amount of gases suitable for driving the pneumatic device for the pre-determined amount of time. Diverting a portion of boosted intake air to the pressure booster to increase the amount of gases stored within the accumulator in this way may be referred to herein as charging the accumulator. Because the portion of boosted intake air is diverted to the pressure booster while maintaining the engine speed, the charging of the accumulator may occur without a loss of engine performance (e.g., without decreasing the torque output of the engine). As a result, operator comfort may be increased.

The accumulator intake valve is closed while concurrently controlling the throttle position at 420. The controller may control the throttle position (e.g., the amount of opening of the throttle valve, similar to the throttle 20 shown by FIG. 1 and described above) concurrently while closing the accumulator intake valve in order to maintain the engine speed and/or intake boost pressure as the accumulator intake valve is closed. For example, adjusting the accumulator intake valve from a fully opened position or partially opened position to the fully closed position reduces the flow of intake boost air to the pressure booster (e.g., reduces the amount of boost air flowing from the compressor to the pressure booster). Without concurrently controlling the throttle position based on the accumulator intake valve position, the reduced flow of intake boost air to the pressure booster may result in an increase in the boost air pressure in a relatively short amount of time (e.g., the amount of time to adjust the accumulator intake valve from the fully opened position or partially opened position to the fully closed position). The increase in boost air pressure may result in undesirable increases in engine speed. However, by controlling the throttle position concurrently with the closing of the accumulator intake valve, a likelihood of undesirable increases in engine speed may be reduced (e.g., engine speed may be maintained while the accumulator intake valve is closed). As one example, as the controller adjusts the accumulator intake valve to the fully closed position, the controller may concurrently decrease an amount of opening of the throttle in order to maintain the engine speed as the accumulator intake valve is closed. As a result, engine torque output may be maintained consistently, and operator comfort may be increased.

Returning to 410, if the boost pressure is not greater than the threshold boost pressure, a determination is made of whether the emissions control device (ECD) temperature is less than a threshold temperature at 412. The threshold temperature may be a pre-determined temperature at which degradation of the ECD does not occur. For example, during conditions in which the ECD temperature is less than the threshold temperature, a likelihood of degradation of the ECD resulting from the temperature of the ECD may be reduced. In some examples, the threshold temperature may correspond to a typical temperature of the ECD during conditions in which the engine operates at cruising speeds (e.g., 2500 RPM). As one example, the threshold temperature may be 1400° F., 1600° F., etc. If the ECD temperature is less than the threshold temperature at 412, the intake air pressure is boosted while opening the accumulator intake valve and concurrently controlling throttle position at 416.

A portion of boosted intake air is diverted to the accumulator while concurrently adjusting the throttle position to maintain engine speed (e.g., operator requested engine speed, according to a pedal position of the vehicle) until the accumulator pressure is at least equal to the threshold pressure at 418, as described above. Boosting the intake air pressure may include increasing the intake air pressure downstream of the compressor by controlling both the amount of opening of the accumulator intake valve and the amount of opening of the throttle concurrently. For example, the throttle may be opened at a faster, first rate while the accumulator intake valve is opened at a slower, second rate to increase the intake air pressure above the threshold boost pressure. Boosting the intake air pressure may include adjusting a position of a waste gate configured to bypass exhaust gases around the turbine of the turbocharger driving the compressor. For example, the controller may decrease an amount of opening of the waste gate (e.g., adjust the waste gate to a fully closed position) in order to increase the amount of exhaust gases flowing to the turbine to increase the rotation speed of the compressor, which may result in increased intake air pressure. The controller may adjust the position of the waste gate in combination with the adjustment to the position of the throttle and the adjustment of the accumulator intake valve. Specifically, opening the accumulator intake valve and concurrently controlling the throttle position may also include concurrently controlling the position of the waste gate (e.g., waste gate 92 shown by FIG. 1 and described above). By boosting the intake air pressure above the threshold boost pressure at 416, the controller may maintain the engine speed while diverting boosted intake air to the pressure booster until the accumulator pressure is greater than the threshold accumulator pressure at 418, as described above. The controller may then close the accumulator intake valve while concurrently controlling the throttle position at 420, as described above.

Returning to 412, if the ECD temperature is greater than the threshold temperature, the accumulator conditions are maintained at 422, as described above. For example, maintaining the accumulator conditions may include not diverting boosted intake air to the pressure booster to increase the amount of gases stored within the accumulator (e.g., the amount of gases stored within the accumulator may be maintained).

Figure 5:
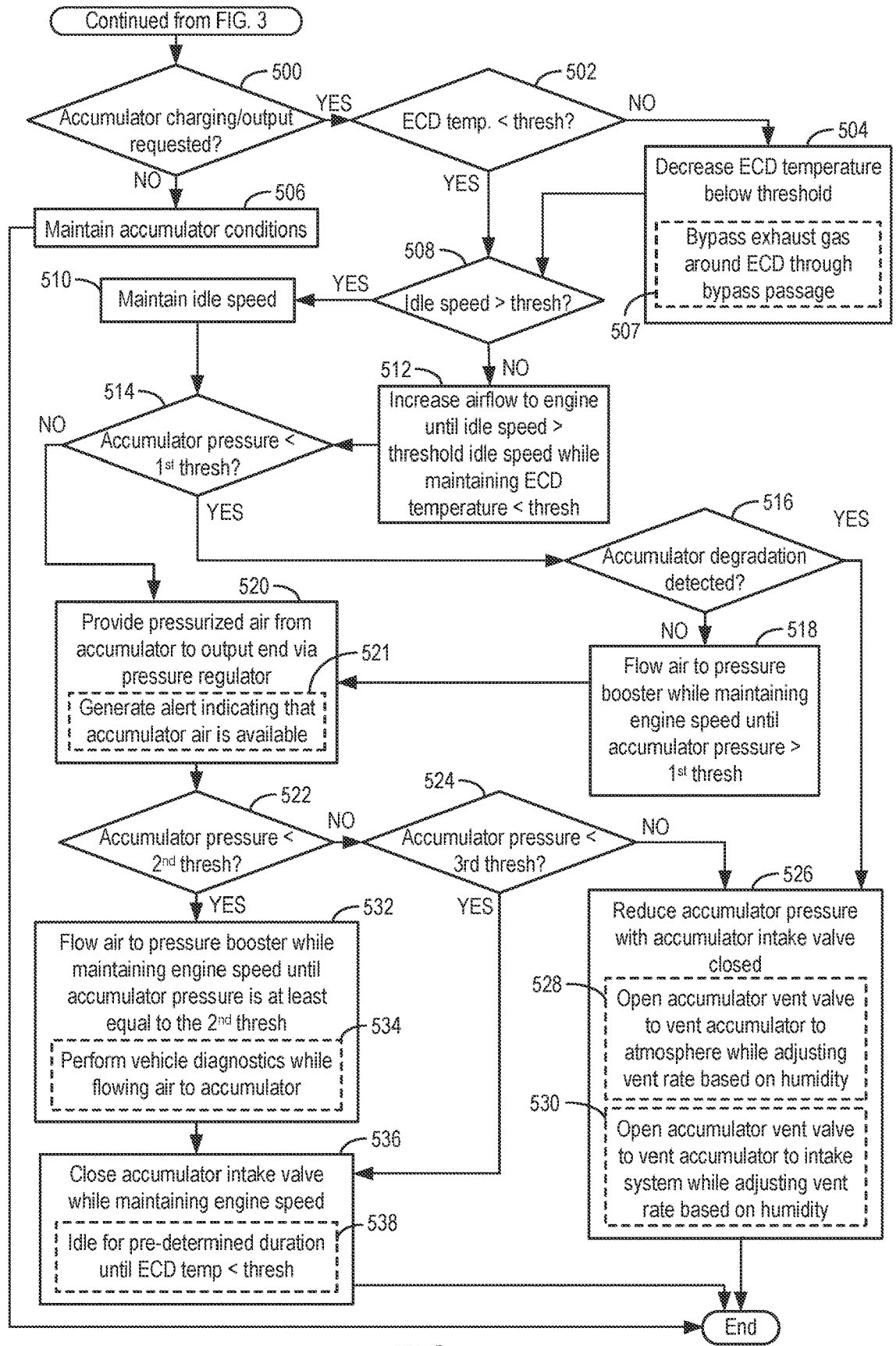
FIG. 5 shows a flowchart illustrating control of airflow of the accumulator in a second mode according to the method of FIG. 3.

Referring to now FIG. 5, a continuation of method 300 of FIG. 3 during conditions in which the accumulator airflow is controlled according to the second mode is shown. The determination of whether accumulator output is requested may include determining whether a user (e.g., the operator of the engine) has selected accumulator output via one or more user interface devices. For example, the accumulator may be fluidly coupled to an output end of a passage (e.g., output end 182 of passage 197 shown by FIG. 1 and described above), with the output end fluidly coupled to a pneumatic device such as a pneumatically actuated tool (e.g., pneumatic tool 184 shown by FIG. 1 and described above). The output end may be normally closed, such that during conditions in which the user does not select accumulator output via the one or more user interface devices, gases do not flow from the accumulator to the pneumatic device through the output end. However, during conditions in which the user does select accumulator output via the one or more user interface devices (e.g., the user presses a button, switch, or other user interface device configured to indicate that output of pressurized gases stored within the accumulator is desired), the output end may open in order to flow gases from the accumulator to the pneumatic device. In some examples, the one or more user interface devices may be arranged at, or on, the pneumatic device and/or output end. As one example, the one or more user interface devices may include a lever, and during conditions in which the user depresses the lever, gases may flow from the accumulator to the pneumatic device through the output end. In some examples, one or more sensors may indicate to the controller that accumulator output is requested (e.g., via electronic signals transmitted to the controller) responsive to the input from the user to the one or more user interface devices (e.g., the depression of the lever described above). In other examples, the controller may sense a flow of gases from the accumulator to the output end responsive to the user input via one or more sensors (e.g., accumulator pressure sensors, such as pressure sensor 166 shown by FIG. 1 and described above), and the controller may make the determination that the accumulator output is requested based on the sensed flow to the output end.

A determination of whether accumulator charging and/or output is requested is made at 500. Determining whether accumulator charging is enabled may include determining whether the operator of the engine (e.g., the driver of the vehicle including the engine) has selected accumulator charging via one or more user interface devices (e.g., switches, buttons, touch screens, etc.), similar to the examples described above with reference to 408 of FIG. 4. As one example, a cabin of the vehicle in which the operator sits may include a switch or other user interface device configured to enable the operator to select between an engine operating mode in which accumulator charging is enabled and an operating mode in which accumulator charging is not enabled. The user interface device may be electronically coupled to the electronic controller of the engine (e.g., controller 12 shown by FIG. 1 and described above), and the electronic controller may receive signals (e.g., electronic signals) from the user interface device indicating the engine operating mode selected by the operator (e.g., the mode in which accumulator charging is enabled, or the mode in which accumulator charging is not enabled).

If accumulator charging and/or output is not requested at 500, accumulator conditions are maintained at 506. Maintaining the accumulator conditions may include not flowing gases from the accumulator to the output end, not flowing gases from downstream of the compressor to the pressure booster in order to store gases within the accumulator, etc. For example, maintaining the accumulator conditions may include maintaining the pressure of gases within the accumulator, not venting gases within the accumulator to atmosphere and/or to the intake passages of the engine, etc.

If accumulator charging and/or output is requested at 500, a determination of whether the emissions control device (ECD) temperature is less than a threshold temperature is made at 502. The threshold temperature may be a pre-determined temperature at which degradation of the ECD does not occur, similar to the example described above with reference to 412 of FIG. 4. For example, during conditions in which the ECD temperature is less than the threshold temperature, a likelihood of degradation of the ECD resulting from the temperature of the ECD may be reduced.

If the ECD temperature is not less than the threshold temperature at 502, the ECD temperature is decreased below the threshold temperature at 504. Decreasing the ECD temperature below the threshold temperature may include reducing engine speed and/or operating the engine for a duration in order to cool the ECD via ambient air (e.g., atmospheric air). In some examples, the controller may adjust one or more operating parameters of the engine such as spark timing, fuel injection rate, engine coolant flow rate, etc. in order to reduce a temperature of exhaust gases flowing to the ECD to reduce the temperature of the ECD. Decreasing the ECD temperature at 504 may optionally include bypassing exhaust gas around the ECD through a bypass passage. For example, the ECD may be one of two or more ECDs arranged downstream of the engine relative to an exhaust flow from the engine, and bypassing exhaust gas around the ECD via the bypass passage may include diverting exhaust gas from a location upstream of the ECD to a location downstream of the ECD. The location downstream of the ECD may be upstream of a second ECD, and flowing the exhaust gases through the second ECD and not through the first ECD may increase a cooling rate of the first ECD.

If the ECD temperature is less than the threshold temperature at 502 or if the ECD temperature is decreased below the threshold temperature at 504, a determination of whether the engine idle speed is greater than a threshold idle speed is made at 508. The threshold idle speed may be a relatively low pre-determined idle speed at which combustion stability is maintained. For example, at engine speeds lower than the threshold idle speed, a likelihood of undesirable combustion instability may be increased (e.g., incomplete combustion, misfires, etc.).

If the idle speed is greater than the threshold idle speed at 508, the idle speed is maintained at 510. For example, because the idle speed is greater than the threshold idle speed, the idle speed may be maintained with a decreased likelihood of combustion instability.

However, if the idle speed is not greater than the threshold idle speed at 508, airflow to the engine is increased until the idle speed is at least equal to the threshold idle speed while maintaining the temperature of the ECD at less than the threshold temperature at 512. Increasing the airflow to the engine may include adjusting the amount of opening of the throttle (e.g., throttle 20 shown by FIG. 1 and described above). For example, the controller may increase the amount of opening of the throttle in order to increase the idle speed of the engine above the threshold idle speed. The controller may maintain the throttle in the position with the increased amount of opening in order to maintain the engine at the increased idle speed (e.g., the idle speed above the threshold idle speed).

As the controller increases the airflow to the engine to increase the idle speed above the threshold idle speed, the controller concurrently monitors (e.g., measures) the temperature of the ECD and may concurrently adjust the airflow to the engine based on both the engine idle speed and the ECD temperature. For example, as the controller adjusts the throttle position to increase the airflow to the engine and increase the engine idle speed, the increased idle speed may increase the temperature of the ECD. During conditions in which the controller determines that the temperature of the ECD is approaching the threshold temperature as the idle speed is increased, the controller may adjust a rate of increase of the idle speed (e.g., a rate at which airflow to the engine is increased via a rate of opening of the throttle) to reduce a likelihood that the ECD temperature will exceed the threshold temperature. The threshold temperature of the ECD may be the same threshold temperature described above at 502.

If the idle speed is maintained at 510 or the airflow to the engine is increased until the idle speed is at least equal to the threshold idle speed while maintaining the temperature of the ECD at less than the threshold temperature at 512, a determination of whether the accumulator pressure is less than a first threshold pressure is made at 514. The first threshold pressure may be a predetermined pressure based on a lower, first gas storage pressure of the accumulator. For example, the first threshold pressure may be based on a lower, first pre-determined amount of gases (e.g., mass of gases) to be stored within the accumulator, such that during conditions in which the amount of gases stored within the accumulator is equal to the first pre-determined amount of gases, the pressure of gases stored within the accumulator is equal to the first threshold accumulator pressure. The first pre-determined amount of gases to be stored within the accumulator may correspond to an amount of gases suitable for driving operation of a pneumatic device (e.g., pneumatic tool 184 shown by FIG. 1 and described above) for a lower, first pre-determined amount of time (e.g., 2 minutes, 3 minutes, etc.).

If the accumulator pressure is not less than the first threshold pressure at 514, pressurized air is provided from the accumulator to the output end via the pressure regulator. For example, the controller may flow gases from the accumulator through the pressure regulator (e.g., pressure regulator 180 shown by FIG. 1 and described above) to the output end (e.g., output end 182 shown by FIG. 1 and described above) such that pressurized gases from the accumulator are available to drive a pneumatic device coupled to the output end (e.g., pneumatic device 184 shown by FIG. 1 and described above). As one example, the controller may adjust a valve of the pressure regulator (e.g., similar to the valve described above with reference to pressure regulator 180 shown by FIG. 1) from a fully closed position to a partially opened position or fully opened position in order to fluidly couple the accumulator 168 to the output end 182 via the pressure regulator 180. The output end 182 may be normally sealed such that gases from the pressure regulator do not flow from the output end 182 to the pneumatic device or to atmosphere. However, responsive to an input to the pneumatic device (e.g., depression of a lever, button, or the like of the pneumatic device, similar to the example described above) from a user (e.g., the operator of the engine), gases from the pressure regulator may flow to the pneumatic device in order to drive the pneumatic device. Providing the pressurized air from the accumulator to the output end via the pressure regulator may include pressurizing the output end via the gases from the pressure regulator and not flowing gases out of the output end until input from the user to flow the gases from the output end to the pneumatic device is received, as described above.

Providing the pressurized air from the accumulator to the outlet via the pressure regulator at 520 may optionally include generating an alert indicating that accumulator air is available at 521. For example, the controller may provide an alert to the operator of the engine to indicate that the accumulator pressure is at least equal to the lower, first pressure. The alert may include an audible alert (e.g., a tone, beeping, etc.), visual alert (e.g., illuminated icon), or other type of alert provided to one or more locations of the vehicle (e.g., within a cabin of the vehicle, at the output end configured to couple to the pneumatic device, etc.).

Returning to 514, if the accumulator pressure is less than the first threshold pressure at 514, a determination of whether accumulator degradation is detected is made at 516. In some examples, the determination of whether accumulator degradation has occurred may include comparing a current accumulator pressure to one or more previous accumulator pressures via the controller. For example, prior to the determination at 516 (e.g., during a previous operating duration of the engine immediately prior to the most recent engine start or key-on event), one or more measurements of accumulator pressure may be stored in a memory of the controller. The controller may compare the accumulator pressure at 516 to the one or more previous measurements of the accumulator pressure in order to determine a difference between the current accumulator pressure and the accumulator pressures prior to the determination at 516. The controller may determine an expected accumulator pressure based on changes to the accumulator conditions between the previous measurement of accumulator pressure and the current measurement. For example, the expected accumulator pressure may be updated by the controller based on ambient temperature, flow of gases to the accumulator, etc. If the controller determines that the difference between the expected accumulator pressure and the currently measured accumulator pressure is greater than a threshold value (e.g., greater than 5% difference, 10% difference, etc.), the controller may determine that accumulator degradation has occurred. Accumulator degradation may include undesired operation of the accumulator, such as flow of gases from the accumulator during conditions in which the flow of gases from the accumulator is not requested (e.g., not requested by the user via the one or more user input devices).

If accumulator degradation is not detected at 516, air flows to the pressure booster while maintaining engine speed until the accumulator pressure is greater than the first threshold pressure at 518, where the first threshold pressure is the same as the first threshold pressure described above with reference to 514. Pressurized air is then provided from the accumulator to the outlet via the pressure regulator at 520 as described above.

However, if accumulator degradation is detected at 516, the accumulator pressure is reduced with the accumulator intake valve closed at 526. Reducing the accumulator pressure with the accumulator intake valve closed may decrease a likelihood of increased degradation of the accumulator by depressurizing the accumulator. In some examples, reducing the accumulator pressure with the accumulator intake valve closed may include decreasing the pressure of gases within the interior of the accumulator to a same pressure as ambient air (e.g., atmospheric air pressure).

Reducing the accumulator pressure with the accumulator intake valve closed at 526 may optionally include opening the accumulator vent valve to vent the accumulator to atmosphere while adjusting the vent rate based on humidity at 528. For example, the amount of opening of the accumulator vent valve (e.g., similar to valve 192 shown by FIG. 1 and described above) may be adjusted by the controller in order to control a flow rate of gases from the accumulator through the accumulator vent valve to atmosphere, and the controller may concurrently adjust the flow rate of the gases from the accumulator based on a humidity of the gases to reduce a likelihood of condensation formation, similar to the examples described above with reference to 404 of FIG. 4. In some examples, reducing the accumulator pressure with the accumulator intake valve closed at 526 may optionally include opening the accumulator vent valve to vent the accumulator to the intake system while adjusting the vent rate based on humidity at 530. Similar to the examples described above at 406 of FIG. 4, opening the accumulator vent valve to vent the accumulator to the intake system may occur alone or in combination with opening accumulator vent valve to vent the accumulator to atmosphere. Further, adjustment of the flow rate of gases from the accumulator to the intake system may be based on the humidity of the gases stored within the accumulator and/or the humidity of gases in the intake system, as described above.

Returning to 520, if the pressurized air is provided from the accumulator to the output end via the pressure regulator, a determination of whether the accumulator pressure is less than a second threshold pressure (second threshold gas pressure) is made at 522. The second threshold pressure may be a pre-determined pressure based on a higher, second gas storage pressure of the accumulator (e.g., higher relative to the lower, first gas storage pressure described above at 514). For example, the second threshold pressure may be based on a higher, second pre-determined amount of gases (e.g., mass of gases) to be stored within the accumulator, such that during conditions in which the amount of gases stored within the accumulator is equal to the second predetermined amount of gases, the pressure of gases stored within the accumulator is equal to the second threshold accumulator pressure. The second pre-determined amount of gases to be stored within the accumulator may correspond to an amount of gases suitable for driving operation of a pneumatic device (e.g., pneumatic tool 184 shown by FIG. 1 and described above) for a higher, second pre-determined amount of time (e.g., 5 minutes, 10 minutes, etc.). In some examples, the second threshold pressure may be the same pressure (e.g., a same amount of pressure) as the threshold pressure described above with reference to 400 of FIG. 4.

If the accumulator pressure is less than the second threshold pressure at 522, air flows to the pressure booster while maintaining engine speed until the accumulator pressure is at least equal to the second threshold pressure at 532. For example, the controller may concurrently control the position of the throttle (e.g., the amount of opening of the throttle) in order to maintain the engine speed as the air flows to the pressure booster, similar to the examples described above with reference to 418 of FIG. 4 (e.g., the controller may increase the amount of opening of the throttle to maintain the engine speed as air is diverted from the engine to the pressure booster). As described above, the volume of the interior of the accumulator may be a fixed volume, and as gas is stored within the interior of the accumulator (e.g., by flowing gas to the pressure booster, similar to the examples described above with reference to FIG. 1), a pressure of the gas stored within the accumulator may increase. Air flows to the pressure booster until the pressure of the gas stored within the accumulator is at least equal to the second threshold pressure.

In some examples, flowing air to the pressure booster while maintaining the engine speed until the accumulator pressure is at least equal to the second threshold pressure at 532 may optionally include performing vehicle diagnostics while flowing air to the pressure booster. For example, the controller may initiate diagnostics to determine whether degradation of the ECD has occurred, to determine whether degradation of one or more intake passages has occurred, etc. Performing the diagnostics may include adjusting one or more parameters such as engine speed, coolant flow rate, exhaust gas flow rate, intake air flow rate, etc. In some examples, the diagnostics performed may result in increased engine noise and/or vibration. However, by performing the diagnostics while flowing air to the pressure booster, the increased noise and/or vibration resulting from the diagnostics may be less noticeable to the operator of the engine (e.g., an acoustic harshness of the diagnostics may be decreased), and operator comfort may be increased.

Returning to 522, if the accumulator pressure is not less than the second threshold pressure at 522, a determination is made of whether the accumulator pressure is less than a third threshold pressure (third threshold gas pressure) at 524. The third threshold pressure may be a predetermined pressure based on a maximum desired gas storage pressure of the accumulator (e.g., a higher pressure relative to the second threshold pressure described above at 522). For example, the third threshold pressure may be based on a maximum pre-determined amount of gases (e.g., mass of gases) to be stored within the accumulator, such that during conditions in which the amount of gases stored within the accumulator is equal to the third pre-determined amount of gases, the pressure of gases stored within the accumulator is equal to the third threshold accumulator pressure. The third threshold pressure may be pre-determined to reduce a likelihood of degradation of the accumulator. For example, during conditions in which the gases stored within the accumulator are at pressures than the third threshold pressure, a likelihood of degradation of the accumulator may be decreased relative to conditions in which the gases stored within the accumulator are at pressures greater than the third threshold pressure. As such, storage of gases within the accumulator at pressures greater than the third threshold pressure may be undesirable.

If the accumulator pressure is not less than the third threshold pressure at 524, the accumulator pressure is reduced with the accumulator intake valve closed at 526 as described above. Reducing the accumulator pressure with the accumulator intake valve closed may optionally include opening the accumulator vent valve to vent the accumulator to atmosphere while adjusting the vent rate based on humidity at 528 as described above, and/or reducing the accumulator pressure with the accumulator intake valve closed may optionally include opening the accumulator vent valve to vent the accumulator to the intake system while adjusting the vent rate based on humidity at 530 as described above.

If air flows to the accumulator while maintaining engine speed until the accumulator pressure is at least equal to the second threshold pressure at 532 or the accumulator pressure is less than the third threshold pressure at 524, the accumulator intake valve is closed while maintaining engine speed at 536. The controller may control the throttle position (e.g., the amount of opening of the throttle valve, similar to the throttle 20 shown by FIG. 1 and described above) concurrently while closing the accumulator intake valve in order to maintain the engine speed and/or intake boost pressure as the accumulator intake valve is closed. For example, adjusting the accumulator intake valve from a fully opened position or partially opened position to the fully closed position reduces the flow of intake boost air to the pressure booster (e.g., reduces the amount of boost air flowing from the compressor to the pressure booster). Without concurrently controlling the throttle position based on the accumulator intake valve position, the reduced flow of intake boost air to the pressure booster may result in an increase in the boost air pressure in a relatively short amount of time (e.g., the amount of time to adjust the accumulator intake valve from the fully opened position or partially opened position to the fully closed position). The increase in boost air pressure may result in undesirable increases in engine speed. However, by controlling the throttle position concurrently with the closing of the accumulator intake valve, a likelihood of undesirable increases in engine speed may be reduced (e.g., engine speed may be maintained while the accumulator intake valve is closed). As one example, as the controller adjusts the accumulator intake valve to the fully closed position, the controller may concurrently decrease an amount of opening of the throttle in order to maintain the engine speed as the accumulator intake valve is closed. As a result, engine torque output may be maintained consistently, and operator comfort may be increased.

Closing the accumulator intake valve while maintaining the engine speed at 536 may optionally include idling for a pre-determined duration until the ECD temperature is less than a threshold temperature. For example, if the controller determines that the ECD temperature has increased above the threshold temperature while flowing air to the pressure booster and/or performing vehicle diagnostics as described above, the controller may reduce the ECD temperature by operating the engine at idling speeds without flowing air to the pressure booster until the ECD temperature is less than the threshold temperature. In some examples, the threshold temperature may be the same threshold temperature described above with reference to 502. In other examples, the threshold temperature at 538 may be a lower, second threshold temperature relative to the threshold temperature described above with reference to 502.

Figure 6:
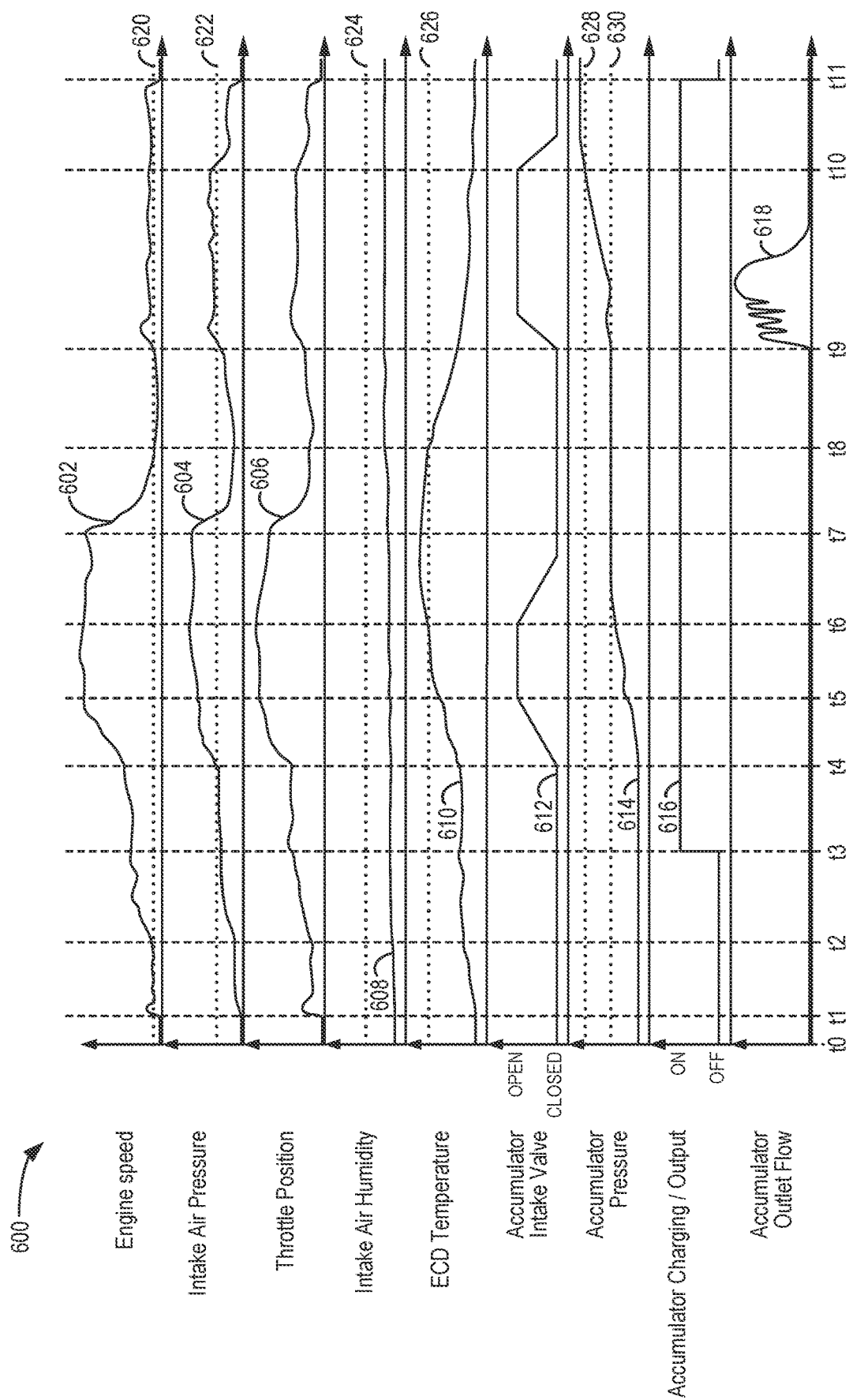
FIG. 6 shows a chart illustrating example engine operation while controlling accumulator airflow.

Referring to FIG. 6, a chart 600 illustrating operation of an engine while controlling accumulator airflow is shown. The engine includes a pressure booster configured to provide pressurized gases to the accumulator. In some examples, the engine described herein with reference to chart 600 may be the engine 10 described above with reference to FIG. 1. Other components described herein with reference to chart 600 may be similar to components described herein with reference to FIG. 1, such as the intake air passage, accumulator, pressure booster, compressor, emissions control device (ECD), and/or throttle (e.g., similar to the intake air passage 142, accumulator 168, pressure booster 164, compressor 114, ECD 170, and throttle 20 described above with reference to FIG. 1).

Chart 600 includes various plots illustrating parameters of the engine between times t0 and t11 and beyond. In particular, chart 600 includes plot 602 indicating engine speed, plot 604 indicating intake air pressure, plot 606 indicating throttle position, plot 608 indicating intake air humidity, plot 610 indicating ECD temperature, plot 612 indicating accumulator intake valve position, plot 614 indicating accumulator pressure, plot 616 indicating accumulator charging/output selection, and plot 618 indicating accumulator outlet flow. Chart 600 additionally includes axes indicating various thresholds associated with above parameters, such as threshold engine speed 620, threshold intake air pressure 622, threshold intake air humidity 624, threshold ECD temperature 626, threshold accumulator pressure 628, and threshold accumulator pressure 630. In some examples, threshold accumulator pressure 630 may be similar to the second threshold described above at 522 of FIG. 5, and the threshold accumulator pressure 628 may be similar to the third threshold described above at 524 of FIG. 5. Accumulator airflow of the engine may be controlled according to a first mode or according to a second mode based on engine conditions, similar to the examples described above with reference to method 300 of FIG. 3, and the thresholds described with reference to FIG. 6 may be similar to (or the same as) those described above with reference to FIGS. 3-5.

Between time t0 and time t1, the engine is not operating (e.g., the engine is in a key-off condition in which fuel and air are not combusted within cylinders of the engine). Accordingly, intake air pressure is low, the throttle position is in the fully closed position, and ECD temperature is low. Accumulator charging or output is not requested as indicated by plot 616, and as a result, the accumulator intake valve is in the closed position as indicated by plot 612 and air does not flow from the accumulator outlet as indicated by plot 618. Further, because accumulator intake valve is in the closed position and the air does not flow from the accumulator outlet, the accumulator pressure is maintained as indicated by plot 614 (e.g., gases do not flow into the accumulator or out of the accumulator).

At time t1, the engine is started. For example, an engine key-on event may occur, which may include an operator of the engine starting the engine by actuating an ignition switch of the engine (e.g., a button, keyed ignition switch, etc.). Starting the engine may include cranking the engine via a starter motor to ignite a mixture of fuel and air within cylinders of the engine. Between time t1 and time t2, engine speed increases slightly during the key-on event and stabilizes as the engine idles. The throttle position increases (e.g., the throttle is opened) responsive to the key-on event along with the increasing engine speed, and as the engine idles, the intake air pressure increases slightly. As the engine idles, the ECD temperature increases slightly. Because the engine is idling, accumulator airflow may be controlled according to the second mode, similar to the second mode of method 300 described above with reference to FIG. 5. However, between time t1 and time t2, accumulator charging or output is not requested as indicated by plot 616, and as a result, the accumulator intake valve is maintained in the closed position as indicated by plot 612 and gases do not flow out of the accumulator outlet as indicated by plot 618. Maintaining the accumulator intake valve in the closed position may occur because the accumulator charging or output is not requested, similar to the example described above at 500 of FIG. 5. As a result, the accumulator conditions are maintained, similar to the example described above at 506 of FIG. 5.

Between time t2 and time t3, engine speed increases gradually to speeds above idling, and the throttle position is further increased (e.g., the amount of opening of the throttle increased). The intake air pressure increases but does not exceed the threshold intake air pressure 622. The ECD temperature increases slightly with the increasing engine speed but remains below the threshold ECD temperature 626. Because the engine is operating at speeds above idling, accumulator airflow may be controlled according to the first mode, similar to the first mode of method 300 described above with reference to FIG. 4. The accumulator pressure as indicated by plot 614 is less than the threshold accumulator pressure 630, and because accumulator charging or output is not enabled as indicated by plot 616, the accumulator conditions are maintained, similar to the example described above at 422 of FIG. 4. In particular, the accumulator intake valve is maintained in the closed position as indicated by plot 612, and gases do not flow out of the accumulator, as indicated by plot 618.

At time t3, accumulator charging is requested (e.g., enabled), as indicated by plot 616. Similar to the example described above with reference to 408 of FIG. 4, the accumulator charging request may include selection of accumulator charging via one or more user interface devices (e.g., switches, buttons, touch screens, etc.) by an operator of the engine (e.g., the driver of the vehicle including the engine). Between time t3 and time t4, because the intake air pressure (e.g., boost pressure) indicated by plot 604 is less than the threshold intake air pressure 622, and because the ECD temperature indicated by plot 610 is less than the threshold ECD temperature 626, the accumulator conditions are maintained even though the accumulator charging is requested as indicated by plot 616 (e.g., similar to the example described above with reference to 422 of FIG. 4). For example, the accumulator intake valve is maintained in the closed position (e.g., fully closed position), as indicated by plot 612.

At time t4, the intake air pressure increases above the threshold intake air pressure 622. Because the accumulator charging is requested as indicated by plot 616, between time t4 and time t5, the accumulator intake valve is adjusted from the closed position to the opened position as indicated by plot 612 while concurrently controlling the throttle position as indicated by plot 606, similar to the example described above at 414 of FIG. 4. In some examples, controlling the throttle position concurrently while adjusting the accumulator intake valve position may include increasing the amount of opening of the throttle concurrently while increasing the amount of opening of the accumulator intake valve. For example, the throttle may be opened by a larger amount while the accumulator intake valve is adjusted from the closed position to the opened position relative to conditions in which the amount of opening of the accumulator intake valve is not adjusted. Controlling the throttle position concurrently while adjusting the accumulator intake valve from the closed position to the fully opened position may enable the engine speed to be maintained at the speed requested by the operator while also providing charging of the accumulator via flow of intake air to the pressure booster arranged upstream of the accumulator. Because the accumulator intake valve is opened between time t4 and time t5, the accumulator pressure increases as indicated by plot 614.

At time t5, the accumulator intake valve is in the fully opened position, as indicated by plot 612. The engine speed indicated by plot 602 is relatively high (e.g., conditions of near wide-open throttle, as indicated by plot 606), and the intake air pressure is relatively high (e.g., above the threshold intake air pressure 622, as indicated by plot 604). Between time t5 and time t6, the accumulator intake valve is held in the fully opened position in order to continue to flow intake air to the pressure booster to charge the accumulator (e.g., increase the pressure of gases within the accumulator). Between time t5 and time t6, the engine speed is maintained at the relatively high amount.

At time t6, the ECD temperature exceeds the threshold ECD temperature 626. As a result, although accumulator charging is requested as indicated by plot 616, the accumulator intake valve is adjusted from the fully opened position to the fully closed position between time t6 and time t7 as indicated by plot 612. The threshold ECD temperature 626 may be similar to the threshold ECD temperature described above at 412 of FIG. 4. As a result, the accumulator conditions (e.g., the accumulator pressure indicated by plot 614) are maintained by closing the accumulator intake valve to stop the charging of the accumulator, similar to the example described above at 422 of FIG. 4.

Between time t7 and time t8, the engine speed reduces as indicated by plot 602, the intake air pressure reduces as indicated by plot 604, and the amount of throttle opening is reduced as indicted by plot 606. The ECD temperature indicated by plot 610 remains higher than the threshold ECD temperature 626 but gradually decreases, while the accumulator pressure indicated by plot 614 is maintained.

At time t8, the ECD temperature indicated by plot 610 decreases below the threshold ECD temperature 626. However, the engine speed indicated by plot 602 is reduced below the threshold engine speed 620 and the accumulator airflow is controlled according to the second mode, similar to the example described above at 508 of FIG. 5. As a result, between time t8 and time t9, the amount of opening of the throttle is increased to increase airflow to the engine, similar to the example described above at 512 of FIG. 5. Although accumulator charging is requested as indicated by plot 616, because the engine speed is less than the threshold engine speed 620, the accumulator intake valve is maintained in the fully closed position as indicated by plot 612, and charging of the accumulator does not occur.

At time t9, the engine speed is increased above the threshold engine speed 620, and the ECD temperature is below the threshold ECD temperature 626. Further, at time t9, the operator may request output of pressurized gases from the accumulator, similar to the examples described above. For example, the operator may select accumulator output via the one or more user interface devices (e.g., a button, switch, or other user interface device configured to indicate that output of pressurized gases stored within the accumulator is desired), such that an output end of the accumulator opens to flow gases from the accumulator to a pneumatic device fluidly coupled to the accumulator (e.g., pneumatic tool 184 shown by FIG. 1 and described above). As a result of the accumulator output request, gases flow from the accumulator through the accumulator outlet to the pneumatic device for a portion of the duration between time t9 and time t10 (e.g., according to user demand), as indicated by plot 618. Further, because the engine is idling between time t9 and time 10 and the intake air pressure is maintained above the threshold intake air pressure 622 as indicated by plot 604, the accumulator intake valve is opened to enable charging of the accumulator while the pneumatic device is in use.

At time t10, the accumulator pressure increases above threshold accumulator pressure 628. As a result, although accumulator charging is still requested, the accumulator intake valve is adjusted from the fully opened position to the fully closed position between time t10 and time t11 in order to stop charging of the accumulator (e.g. maintain the accumulator conditions).

At time t11, the engine is turned off, such that fuel and air are not combusted within the engine cylinders. The accumulator intake valve is maintained in the fully closed position, and gases do not flow out of the accumulator. In this configuration, the charge stored within the accumulator (e.g., the pressurized gases within the interior of the accumulator) may be maintained for use at later times (e.g., to provide pressurized air to the accumulator outlet for a duration before charging the accumulator again).

In this way, by controlling accumulator airflow according to engine conditions, the accumulator may store pressurized gases in order to drive one or more pneumatic devices according to user demand. The accumulator may charge as the vehicle is driven or while the engine idles in order to ensure that pressurized gases are available responsive to user demand. As a result, operation of pneumatic devices may be provided by the engine system without additional compressors, and a cost of the engine system may be reduced.

The technical effect of controlling accumulator airflow responsive to engine conditions is to store pressurized gases within the accumulator that may be used to drive one or more pneumatic devices.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multithreading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising: electrically actuating an intake air compressor via an electric motor; storing pressurized air in an accumulator; providing pressurized air from the accumulator to a device via an output end of the accumulator; and controlling flow of pressurized air to the accumulator via a first mode or a second mode based on a comparison of a vehicle speed to a threshold vehicle speed.

2. The method of claim 1, wherein the first mode comprises determining if a pressure of the accumulator is less than a threshold pressure, further comprising closing an intake valve of the accumulator in response to the pressure not being less than the threshold pressure.

3. The method of claim 2, wherein the first mode further comprises determining if accumulator charging is desired in response to the pressure being less than the threshold pressure, wherein accumulator charging is desired in response to a user actuating a user interface device.

4. The method of claim 3, wherein the first mode further comprises determining if a boost pressure is greater than a threshold boost pressure, wherein the intake valve of the accumulator is opened in response to the boost pressure being greater than the threshold boost pressure and a portion of pressurized air is diverted to the accumulator.

5. The method of claim 1, wherein providing pressurized air from the accumulator to the device without inclusion of additional compressors.

6. The method of claim 1, wherein the second mode comprises the vehicle speed being less than the threshold vehicle speed.

7. The method of claim 6, wherein the second mode further comprises determining if a pressure of the accumulator is less than one or more of a first threshold, a second threshold, and a third threshold, wherein the first threshold is less than the second threshold, the second threshold less than the third threshold.

8. The method of claim 7, wherein the second mode further comprises determining if an accumulator degradation is detected in response to the pressure of the accumulator being less than the first threshold, further comprising closing an intake valve of the accumulator and opening a vent valve of the accumulator in response to the accumulator degradation being detected.

9. The method of claim 7, wherein the second mode further comprises providing pressurized air from the accumulator to the output end to power the device if the pressure of the accumulator is not less than the first threshold, wherein the device is a pneumatic device.

10. The method of claim 9, wherein the second mode further comprises flowing pressurized air to the accumulator until the pressure of the accumulator is equal to the second threshold.

11. The method of claim 7, wherein the second mode further comprises closing an intake valve of the accumulator in response to the pressure of the accumulator being greater than or equal to the second threshold and less than the third threshold.

12. The method of claim 7, wherein the second mode further comprises closing an intake valve of the accumulator and opening a vent valve of the accumulator in response to the pressure of the accumulator being greater than the third threshold.

13. A method for a vehicle, comprising:
electrically actuating an intake-air compressor via an electric motor;
increasing a pressure of gases within an accumulator; and
providing air from the accumulator to an output end to power a device when the vehicle speed is less than a threshold vehicle speed.

14. The method of claim 13, further comprising providing torque to vehicle wheels via the electric motor.

15. The method of claim 13, further comprising increasing the pressure of gases within the accumulator responsive to the pressure decreasing below a threshold pressure.

16. The method of claim 13, further comprising increasing the pressure of gases within the accumulator responsive to providing air from the accumulator to the output end.

17. A system, comprising:
a compressor;
an electric motor configured to drive the compressor; and
an accumulator adapted to store pressurized air and provide pressurized air to a device via an outlet end when a vehicle speed is less than a threshold vehicle speed.

18. The system of claim 17, further comprising a controller with computer readable instructions stored on non-transitory memory that when executed, cause the controller to adjust airflow to a pressure booster based on a pressure of gases within the accumulator.

19. The system of claim 17, wherein a pressure booster is configured to provide pressurized air to the accumulator.

* * * * *